(12) United States Patent
Hoya et al.

(10) Patent No.: US 9,273,202 B2
(45) Date of Patent: Mar. 1, 2016

(54) ADHESIVE COMPOSITION AND ADHESIVE CONTAINING THE SAME

(75) Inventors: Hiroshi Hoya, Chiba (JP); Koji Matsunaga, Yokohama (JP); Yoji Hayakawa, Chiba (JP); Hiroto Yasui, Ichihara (JP); Shin Tokui, Singapore (SG)

(73) Assignee: MITSUI CHEMICALS, INC., Tokyo (JP)

( * ) Notice: Subject to any disclaimer, the term of this patent is extended or adjusted under 35 U.S.C. 154(b) by 254 days.

(21) Appl. No.: 13/119,508

(22) PCT Filed: Aug. 28, 2009

(86) PCT No.: PCT/JP2009/065048
§ 371 (c)(1),
(2), (4) Date: Mar. 17, 2011

(87) PCT Pub. No.: WO2010/032600
PCT Pub. Date: Mar. 25, 2010

(65) Prior Publication Data
US 2011/0172348 A1 Jul. 14, 2011

(30) Foreign Application Priority Data

Sep. 18, 2008 (JP) ................. 2008-239862

(51) Int. Cl.
| | | |
|---|---|---|
| *C08K 5/00* | (2006.01) | |
| *B01F 17/00* | (2006.01) | |
| *C08L 23/14* | (2006.01) | |
| *C09J 123/10* | (2006.01) | |
| *C09J 123/14* | (2006.01) | |
| *C08L 23/10* | (2006.01) | |
| *C08L 23/12* | (2006.01) | |

(52) U.S. Cl.
CPC ............ *C08L 23/142* (2013.01); *C09J 123/10* (2013.01); *C09J 123/142* (2013.01); *C08L 23/10* (2013.01); *C08L 23/12* (2013.01); *C08L 2205/02* (2013.01)

(58) Field of Classification Search
CPC ....... C08L 23/142; C08L 23/10; C08L 23/12; C08L 2205/02; C09J 123/10; C09J 123/142
USPC ................................. 524/528, 515
See application file for complete search history.

(56) References Cited

U.S. PATENT DOCUMENTS

| | | | | |
|---|---|---|---|---|
| 5,256,717 A | * | 10/1993 | Stauffer et al. ............... | 524/293 |
| 5,504,172 A | | 4/1996 | Imuta et al. | |
| 5,681,654 A | * | 10/1997 | Mamish et al. ............... | 428/354 |
| 5,739,366 A | | 4/1998 | Imuta et al. | |
| 5,767,033 A | | 6/1998 | Imuta et al. | |
| 5,959,046 A | | 9/1999 | Imuta et al. | |
| 6,112,888 A | * | 9/2000 | Sauro et al. | |
| 6,486,246 B1 | | 11/2002 | Vion | |
| 6,627,723 B2 | | 9/2003 | Karandinos et al. | |
| 6,747,114 B2 | | 6/2004 | Karandinos et al. | |
| 6,797,774 B2 | | 9/2004 | Kijima | |
| 7,488,789 B2 | | 2/2009 | Ikenaga et al. | |
| 2004/0249046 A1 | | 12/2004 | Abhari et al. | |
| 2006/0276607 A1 | * | 12/2006 | Ikenaga et al. ............ | 526/348.6 |
| 2007/0117894 A1 | | 5/2007 | Bach et al. | |
| 2007/0173162 A1 | * | 7/2007 | Ethiopia et al. ............... | 442/327 |
| 2008/0085977 A1 | | 4/2008 | Okamoto et al. | |
| 2009/0314429 A1 | * | 12/2009 | Hoya et al. ................... | 156/334 |
| 2010/0076128 A1 | | 3/2010 | Abhari et al. | |
| 2010/0093941 A1 | | 4/2010 | Akai et al. | |
| 2010/0120933 A1 | | 5/2010 | Imai et al. | |

FOREIGN PATENT DOCUMENTS

| | | | |
|---|---|---|---|
| EP | 1 788 056 A1 | 5/2007 | |
| JP | 01-098646 | 4/1989 | |
| JP | 07-145212 | 6/1995 | |
| JP | 09-137013 | 5/1997 | |
| JP | 2001-288441 | 10/2001 | |
| JP | 2001-523301 | 11/2001 | |
| JP | 2002-226814 | 8/2002 | |
| JP | 2003-518171 | 6/2003 | |
| JP | 2005-263997 | 9/2005 | |
| JP | 2007-186664 | 7/2007 | |
| JP | 2008-024859 | 2/2008 | |
| WO | WO-01/96490 A1 | 12/2001 | |
| WO | WO-2004/087775 A1 | 10/2004 | |
| WO | WO-2005/100501 A1 | 10/2005 | |
| WO | WO 2008/007575 * | 1/2008 | ............ C08L 23/14 |
| WO | WO-2008/007575 A1 | 1/2008 | |
| WO | WO-2008/099865 A1 | 8/2008 | |
| WO | WO-2008/152933 A1 | 12/2008 | |

* cited by examiner

OTHER PUBLICATIONS

Istvan Benedek, Pressure-Sensitive Adhesives and Applications, CRC Press, New York, Feb. 3, 2004, p. 395.*
Communication (Extended European Search Report) in EP Appln No. 09814445.4, dated Nov. 7, 2011.
International Search Report in PCT/JP2009/065048 dated Dec. 1, 2009.

*Primary Examiner* — Alexander Kollias
(74) *Attorney, Agent, or Firm* — Foley & Lardner LLP

(57) ABSTRACT

It is an object of the present invention to provide adhesive compositions having excellent flexibility, rubber elasticity, mechanical properties, heat resistance and low-temperature properties.
An adhesive composition of the invention includes 10 to 70 parts by weight of a soft polypropylene resin composition (X) which includes 40 to 98 wt % of a propylene copolymer (A) satisfying the following requirements (A1) to (A8) and 2 to 60 wt % of a crystalline isotactic polypropylene (B) satisfying the following requirements (B1) to (B3), and 30 to 90 parts by weight of a tackifier (C) (wherein the total of the component (X) and the component (C) is 100 parts by weight), wherein (A1) Shore A hardness: 20 to 90; (A2) the copolymer comprises a copolymer with $C_3$ units at 51 to 90 mol %, $C_2$ units at 7 to 24 mol % and $C_{4\text{-}20}$ α-olefin units at 3 to 25 mol %; (A3) Mw/Mn: 1.2 to 3.5; (A4) mm: 85 to 99.9%; (A5) value B: 0.8 to 1.3; (A6) 2,1-insertion ratio: less than 1%; (A7) Tg: −10° C. to −50° C.; (A8) MFR (230° C.): 0.5 to 500 g/10 min; (B1) Tm: 100 to 175° C.; (B2) mmmm: 90 to 99.8%; (B3) MFR (230° C.): 0.1 to 100 g/10 min.

10 Claims, 6 Drawing Sheets

DRAWINGS

NMR spectrum of soft polypropylene resin composition (X4) (near 15 to 17.5 ppm)

NMR spectrum of propylene/ethylene/1-butene copolymer (PEBR-1) (near 15 to 17.5 ppm)

ADHESIVE COMPOSITION AND ADHESIVE CONTAINING THE SAME

TECHNICAL FIELD

The present invention relates to adhesive compositions containing a soft polypropylene resin composition (X) which is formed from a propylene copolymer (A) and a crystalline isotactic polypropylene (B) in a specific ratio each having specific property parameters, and to adhesives containing the compositions.

In detail, the present invention is concerned with technology of adhesives that show excellent flexibility, rubber elasticity, mechanical properties (strength, elongation), heat resistance, low-temperature properties and transparency and have a low crystallization rate (solidification rate) to permit good handling properties, particularly when used as hot melt adhesives.

BACKGROUND ART

Hot melt adhesives, which attract attention as solvent-free adhesives with no VOC emissions, contain polymers called base polymers. Known such base polymers are ethylene-based copolymers such as ethylene/vinyl acetate copolymers (EVA) and ethylene/α-olefin copolymers, amorphous polyolefins (APAO) and styrene elastomers (SBS, SIS, SEBS and SEPS). As known in the art, ethylene/vinyl acetate copolymers (EVA) and ethylene/α-olefin copolymers are excellent in flexibility but are inferior in heat resistance and rubber elasticity; styrene elastomers (SIS and SBS) have good flexibility and rubber elasticity but are poor in heat resistance and thermal stability; and amorphous polyolefins (APAO) are highly heat stable but are inferior in mechanical properties (strength). Few base polymers satisfy all the properties with good balance. SEBS is known as a material that is relatively excellent in balance of these properties, but its heat resistance is sometimes insufficient when the resin is used under severe conditions. In particular, stress at a high temperature often results in cohesive failure of adhesives (which is attributed to insufficient heat resistance of the base polymer). Thus, there has been a demand from the industry for base polymers having enhanced performances.

A variety of novel base polymers have been recently proposed which use soft polypropylene polymers having excellent heat resistance. Such soft polypropylene polymers have characteristics that the materials have a narrow molecular weight distribution and a narrow composition distribution by the use of a specific catalyst such as a metallocene catalyst. It has been disclosed that they show excellent performances (for example no reduction in bonding properties due to low-molecular weight components, and no deterioration in processability due to high-molecular weight components) compared to known products having a wide molecular weight distribution and a wide composition distribution, for example APAO.

Patent Literature 1 discloses a technology of obtaining a hot melt adhesive using a propylene/ethylene copolymer. The propylene/ethylene copolymer has excellent flexibility, rubber elasticity and thermal stability, but is insufficient in heat deformation temperature and creep resistance properties under stress at high temperatures. The patent literature also discloses that a crystalline isotactic polypropylene component is added to improve heat resistance. However, according to the knowledge of the present inventors, propylene/ethylene copolymers have poor compatibility with polypropylenes and therefore the improvement in heat resistance is probably insufficient.

Patent Literature 2 discloses a technology of obtaining a hot melt adhesive using a soft polypropylene polymer in which flexibility is achieved by controlling the stereoregularity of the propylene units. This soft polypropylene polymer is considered to have good compatibility with crystalline isotactic polypropylenes compared to the propylene/ethylene copolymers described in Patent Literature 1. However, according to the knowledge of the present inventors, the glass transition temperature of the polymer is probably high, around room temperature, because comonomers other than propylene are little. Accordingly, the base polymer will embrittle at low temperatures and the adhesive will lose stress relaxation properties and will separate easily. Copolymerizing such polymers having low stereoregularity with comonomers such as ethylene will be a possible approach, but in this case the polymers have almost no crystallinity and consequently mechanical strength is lost. Further, the compatibility with crystalline isotactic polypropylene is lowered at the same time, and consequent lowering in heat resistance is anticipated.

Patent Literatures 3 and 4 disclose technologies of obtaining hot melt adhesives having excellent adhesion, wherein a substantially completely amorphous soft polypropylene polymer which has no heat of crystal fusion is used. However, according to the knowledge of the present inventors, the addition of crystalline isotactic polypropylenes to amorphous soft polypropylene polymers showing no crystallinity does not provide sufficient heat resistance, and good mechanical strength and creep resistance properties will not be achieved in particular at high temperatures.

Patent Literature 5 discloses a technology of adhesive compositions using a propylene/1-butene random copolymer having high stereoregularity. Such propylene/1-butene random copolymers have good compatibility with crystalline isotactic polypropylenes compared with the propylene/ethylene copolymers. However, they are very rigid and will not show flexibility required for hot melt adhesives.

CITATION LIST

Patent Literature 1: JP-A-2003-518171
Patent Literature 2: WO 01/096490
Patent Literature 3: JP-A-2001-288441
Patent Literature 4: JP-A-2008-24859
Patent Literature 5: JP-A-H09-137013

SUMMARY OF INVENTION

Technical Problem

It is an object of the present invention to provide adhesive compositions having excellent flexibility, rubber elasticity, mechanical properties (strength, elongation), heat resistance (in particular mechanical properties and rubber elasticity at high temperatures) and low-temperature properties.

Solution to Problem

The present invention is concerned with the following [1] to [5].

[1] An adhesive composition (Y) that comprises 10 to 70 parts by weight of a soft polypropylene resin composition (X) which comprises 40 to 98 wt % of a propylene copolymer (A) satisfying the following requirements (A1) to (A8) and 2 to 60 wt % of a crystalline isotactic polypropylene (B) satisfying the following requirements (B1) to (B3), and 30 to 90 parts by weight of a tackifier (C) (wherein the total of the component (X) and the component (C) is 100 parts by weight).

The propylene copolymer (A) satisfies the following requirements (A1) to (A8):

(A1) The Shore A hardness is in the range of 20 to 90.

(A2) The copolymer is a propylene/ethylene/$C_{4-20}$ α-olefin copolymer comprising 51 to 90 mol % of structural units derived from propylene, 7 to 24 mol % of structural units derived from ethylene and 3 to 25 mol % of structural units derived from an α-olefin having 4 to 20 carbon atoms (wherein the total of the structural units from propylene, the structural units from ethylene and the structural units from an α-olefin having 4 to 20 carbon atoms is 100 mol %).

(A3) The ratio of the weight average molecular weight (Mw) to the number average molecular weight (Mn), (Mw/Mn), according to gel permeation chromatography (GPC) is 1.2 to 3.5.

(A4) The isotactic triad fraction (mm) calculated by $^{13}$C-NMR is 85 to 99.9%.

(A5) The value B defined by Formula (I) below is 0.8 to 1.3.

[Math. 1]

$$B = \frac{M_{OE}}{2M_O \cdot M_E} \quad (1)$$

wherein $M_{OE}$ is a molar fraction of the total of propylene-ethylene sequences and $C_4$ or higher α-olefin-ethylene sequences to all the dyad sequences, $M_O$ is a total of molar fractions of propylene and the $C_4$ or higher α-olefin, and $M_E$ is a molar fraction of ethylene.

(A6) The ratio of 2,1-insertions of propylene monomers in all the propylene insertions is less than 1% according to $^{13}$C-NMR.

(A7) The glass transition temperature (Tg) is observed in the range of −10° C. to −50° C.

(A8) MFR (230° C.) is 0.5 to 500 g/10 min.

The crystalline isotactic polypropylene (B) satisfies the following requirements (B1) to (B3):

(B1) The melting point Tm (B) is in the range of 100 to 175° C. as measured by DSC wherein the polymer is held at 200° C. for 10 minutes in a differential scanning calorimeter (DSC), cooled to −20° C. at a temperature decreasing rate of 10° C./min, held at −20° C. for 1 minute, and heated at a temperature increasing rate of 10° C./min.

(B2) The isotactic pentad fraction (mmmm) is 90 to 99.8%.

(B3) The melt flow rate (MFR) (ASTM D 1238, 230° C., 2.16 kg load) is 0.1 to 100 g/10 min.

In the present invention, the propylene copolymer (A) preferably further satisfies at least one selected from the following requirements (A9) and (A10).

(A9) The melting peak Tm $(A)_1$ is observed in the range of 30 to 80° C. in a differential scanning calorimetry (DSC) curve when a sample conditioned at 23° C.±2° C. for at least 72 hours is cooled to not more than −40° C. and heated at a temperature increasing rate of 10° C./min.

(A10) The storage elastic modulus at 23° C. to 40° C. is in the range of 1 MPa to 100 MPa when the copolymer is analyzed by dynamic solid viscoelasticity measurement in which a sample conditioned at 23° C.±2° C. for at least 72 hours is cooled to not more than −40° C. and heated at a temperature increasing rate of 3° C./min.

The soft polypropylene resin composition (X) preferably satisfies any of the following requirements (X1) to (X3), more preferably the requirement (X1), and most preferably the requirement (X1) and the requirements (X2) and (X3) at the same time.

(X1) The composition has a melting peak Tm (A-X) in the range of 30 to 80° C. and a melting peak Tm (B-X) in the range of 100 to 175° C. in a differential scanning calorimetry (DSC) curve when a sample conditioned at 23° C.±2° C. for at least 72 hours is cooled to not more than −40° C. and heated at a temperature increasing rate of 10° C./min.

(X2) In a differential scanning calorimetry (DSC) curve obtained when a sample conditioned at 23° C.±2° C. for at least 72 hours is cooled to not more than −40° C. and heated at a temperature increasing rate of 10° C./min, the heat of transition (the melting enthalpy) ΔH (A-X) which gives a melting peak Tm (A-X) is 0.5 to 20 J/g, and the heat of transition (the melting enthalpy) ΔH (B-X) which gives a melting peak Tm (B-X) is 3 to 80 J/g.

(X3) A 2 mm thick pressed sheet of the composition has an internal haze of 0.1 to 30% and a total light transmittance of 75 to 99.9%, and preferably an internal haze of 0.1 to 25% and a total light transmittance of 80 to 99.9%.

[2] An adhesive composition (Y2) obtainable by blending 100 parts by weight of the adhesive composition (Y) with 5 to 1000 parts by weight of a low-molecular weight propylene polymer (D) having a melt viscosity at 190° C. of 1 to 15000 mPa·s.

[3] An adhesive composition (Y2) obtainable by blending 100 parts by weight of the adhesive composition (Y) with 5 to 150 parts by weight of a low-molecular weight propylene polymer (D) having a melt viscosity at 190° C. of 1 to 15000 mPa·s.

The low-molecular weight propylene polymer (D) is preferably an isotactic polypropylene polymer or an atactic polypropylene polymer.

[4] A hot melt adhesive comprising the adhesive composition (Y) or the adhesive composition (Y2).

[5] A pressure sensitive adhesive comprising the adhesive composition (Y) or the adhesive composition (Y2).

Advantageous Effects of Invention

The adhesive compositions (Y) and (Y2) of the invention have excellent flexibility, rubber elasticity, mechanical properties (strength, elongation), heat resistance and low-temperature properties, and are suitably used as adhesives under severe conditions. Further, the adhesive compositions (Y) and (Y2) have a low crystallization rate. When the hot melt compositions are brought into contact with an adherend, the compositions do not solidify quickly (have a long open time), thereby being suitably used as hot melt adhesives.

Furthermore, the adhesive compositions (Y) and (Y2) have good transparency and are suitably used as adhesives in applications requiring design properties. Still further, the compositions are useful as adhesives that bond favorably with polyolefins, in particular polypropylenes.

DESCRIPTION OF EMBODIMENTS

Figure 1:
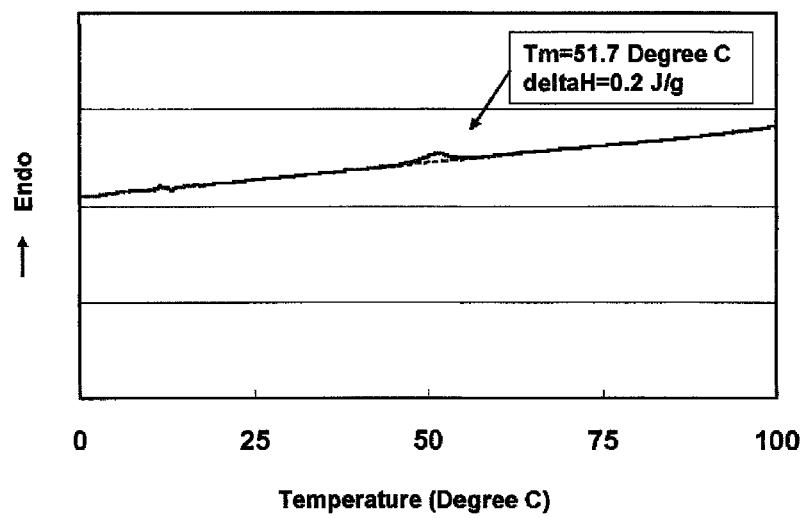
FIG. 1 shows a DSC curve (a first method of DSC measurement) of PEBR-1 belonging to the propylene copolymers (A) according to the invention.

The present invention will be described in detail hereinbelow.

An adhesive composition (Y) of the invention contains a soft polypropylene resin composition (X) formed of a propylene copolymer (A) and a crystalline isotactic polypropylene (B) having specific property parameters in a specific ratio, and a tackifier (C). An adhesive composition (Y2) according to another aspect of the invention is obtainable by blending the adhesive composition (Y) with a specific low-molecular weight propylene polymer (D).

The components will be described below.

Propylene Copolymers (A)

The propylene copolymers (A) used in the invention satisfy all the requirements (A1) to (A8) below.

(A1) The Shore A hardness is in the range of 20 to 90, preferably 25 to 85, and more preferably 27 to 80.

(A2) The copolymer contains 51 to 90 mol %, preferably 60 to 89 mol %, and more preferably 62 to 88 mol % of structural units derived from propylene, 7 to 24 mol %, preferably 8 to 20 mol %, and more preferably 8 to 18 mol % of structural units derived from ethylene, and 3 to 25 mol %, preferably 3 to 20 mol %, and more preferably 4 to 20 mol % of structural units derived from an α-olefin having 4 to 20 carbon atoms (wherein the total of the structural units from propylene, the structural units from ethylene and the structural units from an α-olefin having 4 to 20 carbon atoms is 100 mol %).

(A3) The ratio of the weight average molecular weight (Mw) to the number average molecular weight (Mn), (Mw/Mn), according to gel permeation chromatography (GPC) is 1.2 to 3.5, preferably 1.4 to 3.0, and more preferably 1.6 to 2.6.

(A4) The isotactic triad fraction (mm) calculated by $^{13}$C-NMR is 85 to 99.9%, and preferably 87 to 99.8%.

(A5) The value B defined by Formula (I) below is 0.8 to 1.3, preferably 0.9 to 1.2 and more preferably 0.9 to 1.1.

[Math. 2]

$$B = \frac{M_{OE}}{2M_O \cdot M_E} \qquad (1)$$

wherein $M_{OE}$ is a molar fraction of the total of propylene-ethylene sequences and $C_4$ or higher α-olefin-ethylene sequences to all the dyad sequences, $M_O$ is a total of molar fractions of propylene and the $C_4$ or higher α-olefin, and $M_E$ is a molar fraction of ethylene.

(A6) The ratio of 2,1-insertions of propylene monomers in all the propylene insertions analyzed by $^{13}$C-NMR is less than 1%, preferably 0 to 0.5%, and more preferably 0 to 0.1%.

(A7) The glass transition temperature (Tg) is observed in the range of −10° C. to −50° C., and preferably −15° C. to −40° C.

(A8) The melt flow rate (MFR) (ASTM D 1238, 230° C., 2.16 kg load) is 0.5 to 500 g/10 min, preferably 2 to 50 g/10 min, and more preferably 4 to 12 g/10 min.

The requirements (A1) to (A8) are explained in more detail below.

The Shore A hardness in the requirement (A1) is obtained (in accordance with ASTM D-2240) as follows. The propylene copolymer (A) is molten by heating at 190 to 230° C. and is thereafter pressed at a cooling temperature of 15 to 25° C. to give a test piece. The test piece is stored under an environment at 23° C.±2° C. for at least 72 hours. The test piece is then tested with an A-type tester and the scale is read immediately after the indenter touches the test piece.

The contents (mol %) of the structural units from the comonomers in the requirement (A2) are determined by analyzing a $^{13}$C-NMR spectrum. A preferred α-olefin having 4 to 20 carbon atoms is 1-butene, and selecting this comonomer leads to a drastic improvement in compatibility of the obtainable propylene copolymer (A) with the crystalline isotactic polypropylene (B) described later, with the result that the soft polypropylene resin composition (X) obtained therefrom achieves drastically improved properties.

The propylene copolymers (A) having a molecular weight distribution in the range defined in the requirement (A3) contain small amounts of low-molecular weight components, and thus provide preferred effects such as suppressed stickiness. Further, because the polymers having this narrow molecular weight distribution generally have a small composition distribution, the copolymers achieve drastically improved compatibility with the crystalline isotactic polypropylenes (B).

The propylene copolymers (A) having an isotactic triad fraction (mm) in the range shown in the requirement (A4) do not completely lose crystallinity even when comonomers such as ethylene and 1-butene are copolymerized in large amounts. As a result, excellent mechanical strength, high break elongation and good rubber elasticity are obtained. Further, the propylene copolymer (A) is partially incorporated in the crystal of the crystalline isotactic polypropylene (B), with the result that the obtainable soft polypropylene resin composition (X) achieves drastically improved properties, in particular heat resistance.

The propylene copolymers (A) having a value B in the range defined in the requirement (A5) show improved compatibility with the crystalline isotactic polypropylenes (B) described later. If the value B is in excess of the above range, the copolymer has a primary molecular structure similar to an alternating copolymer in which the monomers (propylene, ethylene and the α-olefin having 4 to 20 carbon atoms) are bonded alternately, and such propylene copolymers (A) have poor compatibility with the crystalline isotactic polypropylenes (B). If the value B is below the aforementioned range, the copolymer has a primary molecular structure similar to a block copolymer in which the monomers form the respective blocks, and such propylene copolymers (A) have poor compatibility with the crystalline isotactic polypropylenes (B).

The propylene copolymers (A) satisfying the requirement (A6) concerning the ratio of 2,1-insertions (inversion) of propylene monomers in all the propylene insertions have excellent regioregularity. In detail, the 2,1-insertions that reduce the crystallinity of the propylene copolymer (A) are few, and the propylene copolymers (A) satisfying the properties are preferable for the same reasons as those in the requirement (A4). The ratio of 2,1-insertions of propylene monomers in all the propylene insertions may be calculated by a method described in JP-A-H07-145212. In a particularly preferred embodiment, no peaks are observed in the range of 15.0 to 17.5 ppm.

The propylene copolymers (A) of the invention have a glass transition temperature in the range shown in the requirement (A7). The propylene copolymers (A) having this glass transition temperature impart practically sufficient low-temperature properties to the adhesive compositions (Y) of the invention.

With the MFR of the propylene copolymers (A) in the range specified in the requirement (A8), improvements are possible in both properties (such as mechanical properties and heat resistance) and processability of the obtainable adhesive compositions. The MFR of the propylene copolymers (A) in the invention is relatively low compared to the conventional polymers such as APAO in order to impart sufficient heat resistance to the adhesive compositions (Y) of the present invention. The improvement in processability is achieved by blending the adhesive composition (Y) with a specific low-molecular weight propylene polymer (D), namely, the adhesive composition (Y2). Details will be described later.

The propylene copolymers (A) of the invention preferably further satisfy at least one selected from the following requirements (A9) and (A10) in addition to the requirements (A1) to (A8).

(A9) The melting peak Tm $(A)_1$ is observed in the range of 30 to 80° C., preferably 30 to 70° C., and more preferably 30 to 60° C. in a DSC curve when a sample conditioned at 23° C.±2° C. for at least 72 hours is cooled to not more than −40° C. and heated at a temperature increasing rate of 10° C./min. In the following description, the DSC measurement method defined in the requirement (A9) is also referred to as the first method of DSC measurement and DSC curve preparation method according to the invention.

(A10) The storage elastic modulus at 23° C. to 40° C. is in the range of 1 MPa to 100 MPa, preferably 1 to 50 MPa, and more preferably 1 to 20 MPa when the copolymer is analyzed by dynamic solid viscoelasticity measurement in which a sample conditioned at 23° C.±2° C. for at least 72 hours is cooled to not more than −40° C. and heated at a temperature increasing rate of 3° C./min.

The requirement (A9) will be described below.

In the requirement (A9), when two or more melting peaks are observed, the largest peak is defined as Tm $(A)_1$. The measurement is performed immediately after the sample is conditioned at 23° C.±2° C. for at least 72 hours. It should be noted that the sample herein is a pressed sheet prepared under the conditions described in the requirement (A1), and no heat treatment at a specific temperature is performed before the conditioning.

The satisfaction of the requirement (A9) by the propylene copolymers (A) means that the propylene copolymers (A) form fine crystal components. Having such fine crystal components facilitates partial incorporation of the propylene copolymer (A) into the crystal of the crystalline isotactic polypropylene (B), with the result that the obtainable adhesive composition (Y) achieves drastically improved mechanical properties, rubber elasticity and heat resistance.

Figure 2:
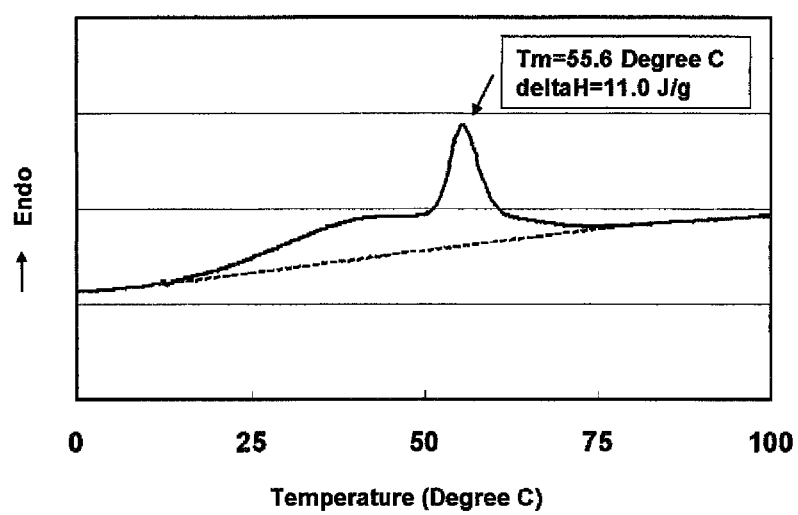
FIG. 2 shows a DSC curve (a first method of DSC measurement) of PEBR-2 belonging to the propylene copolymers (A) according to the invention.
Figure 3:
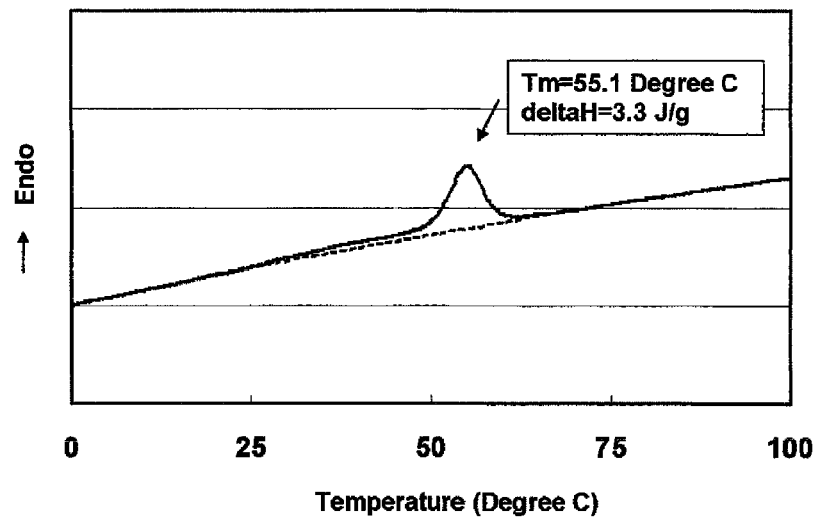
FIG. 3 shows a DSC curve (a first method of DSC measurement) of a propylene/ethylene copolymer (PER) used in Comparative Examples.

Analytical examples of Tm $(A)_1$ and Tm $(A)_2$ are shown in FIGS. 1 to 3.

The melting enthalpies $\Delta H(A)_1$ and $\Delta H(A)_2$ may be determined by a method described in JIS K7122.

Even in the case where the propylene copolymer (A) does not show a melting peak Tm $(A)_1$ defined in the requirement (A9), such copolymer may be suitably used in the invention if it satisfies the requirement (A10). In other words, the satisfaction of the requirement (A10) by the propylene copolymer (A) means that the propylene copolymer (A) forms fine crystal components. Because such fine crystal components are completely molten at a temperature in excess of at least 80° C., it is preferable that the storage elastic modulus at 23° C. to 40° C. is in the range of 1 MPa to 100 MPa, preferably 1 to 50 MPa, and more preferably 1 to 20 MPa, and the storage elastic modulus E' at a temperature of 30 to 80° C., preferably 35 to 70° C., and more preferably 40 to 70° C. is less than 1 MPa. In the invention, the solid viscoelasticity measurement is performed in a tensile mode at 1 Hz. In a particularly preferred embodiment, the requirements (A9) and (A10) are satisfied at the same time.

The propylene copolymers (A) of the invention may be generally obtained by copolymerizing propylene, ethylene and a $C_{4-20}$ α-olefin (an α-olefin having 4 to 20 carbon atoms) in the presence of a metallocene catalyst. For example, catalysts described in WO 2004/087775, for example in Examples e1 to e5, may be used as the metallocene catalysts without limitations.

Crystalline Isotactic Polypropylenes (B)

The crystalline isotactic polypropylenes (B) used in the invention satisfy all the following requirements (B1) to (B3).

(B1) The melting point Tm (B) is in the range of 100 to 175° C., preferably 110 to 170° C., and more preferably 125 to 170° C. as measured by DSC wherein the polymer is held at 200° C. for 10 minutes in a differential scanning calorimeter (DSC), cooled to −20° C. at a temperature decreasing rate of 10° C./min, held at −20° C. for 1 minute, and heated at a temperature increasing rate of 10° C./min.

(B2) The isotactic pentad fraction (mmmm) is 90% to 99.8%, preferably 93% to 99.7%, and more preferably 95% to 99.6%.

(B3) The melt flow rate (MFR) (ASTM D 1238, 230° C., 2.16 kg load) is 0.1 to 100 g/10 min, preferably 1.0 to 60 g/10 min, and more preferably 1.5 to 50 g/10 min.

In the requirement (B1), the melting point Tm (B) is determined by DSC wherein the polymer is held at 200° C. for 10 minutes in a differential scanning calorimeter (DSC), cooled to −20° C. at a temperature decreasing rate of 10° C./min, held at −20° C. for 1 minute, and heated at a temperature increasing rate of 10° C./min. (In the following description, this DSC measurement method is also referred to as the second method of DSC measurement and DSC curve preparation method according to the invention.)

In the requirement (B2), the isotactic pentad fraction (mmmm) indicates the ratio of isotactic pentad sequences in the molecular chain according to $^{13}C$-NMR. It refers to the fraction of propylene monomer units found in the center of sequences in which five propylene monomer units are continuously meso-linked.

In detail, the isotactic pentad fraction is calculated as a fraction of the mmmm peak relative to all the absorption peaks observed in a methyl carbon region of a $^{13}$C-NMR spectrum.

The isotactic pentad fraction (mmmm fraction) may be determined by, for example, a method described in JP-A-2007-186664.

The crystalline isotactic polypropylenes (B) that satisfy all the requirements (B1) to (B3) contribute to improvements in mechanical properties and heat resistance of the soft polypropylene resin compositions (X) and can favorably compatibilize with the propylene copolymers (A).

The crystalline isotactic polypropylenes (B) may be homopolypropylenes, propylene/$C_{2-20}$ α-olefin (except propylene) random copolymers or propylene block copolymers as long as they satisfy the requirements (B1) to (B3). Preferably, they are homopolypropylenes or propylene/$C_{2-20}$ α-olefin random copolymers.

From the viewpoints of heat resistance and rigidity of the obtainable compositions, homopolypropylenes are particularly preferable. In particular, propylene/$C_{2-20}$ α-olefin random copolymers are preferable, in which case the obtainable compositions achieve excellent flexibility and transparency.

Examples of the $C_{2-20}$ α-olefins (the α-olefin having 2 to 20 carbon atoms) except propylene include ethylene, 1-butene, 1-pentene, 3-methyl-1-butene, 1-hexene, 4-methyl-1-pentene, 1-octene, 1-decene, 1-dodecene, 1-tetradecene, 1-hexadecene, 1-octadecene and 1-eicosene. A copolymer with ethylene, a copolymer with a $C_{4-10}$ α-olefin, or a copolymer with ethylene and a $C_{4-10}$ α-olefin is preferable.

Such copolymers usually contain not less than 90 mol % of structural units derived from propylene relative to 100 mol % of the total of the structural units derived from propylene and structural units derived from the $C_{2-20}$ α-olefin(s) except propylene.

The crystalline isotactic polypropylenes (B) used in the invention suitably have a melting enthalpy ΔH (B) which corresponds to the melting point Tm (B) in the requirement (B1) of 50 to 130 J/g, and preferably 55 to 120 J/g. When the crystalline isotactic polypropylenes (B) have a melting enthalpy ΔH (B) in this range, the obtainable soft polypropylene resin compositions and the obtainable adhesive compositions show excellent shaping properties, heat resistance and transparency and have little stickiness.

The crystalline isotactic polypropylenes (B) desirably have a tensile elastic modulus of 500 to 3000 MPa, preferably 600 to 2500 MPa, and more preferably 650 to 2200 MPa. The tensile elastic modulus is obtained by testing a 2 mm thick pressed sheet at 23° C. in accordance with JIS K7113-2.

The crystalline isotactic polypropylenes (B) may be produced by various methods, for example by using a stereoregular catalyst.

In detail, the crystalline isotactic polypropylenes may be produced using a catalyst formed of a solid titanium catalyst component, an organometallic compound catalyst component, and optionally an electron donor.

Specific examples of the solid titanium catalyst components include solid titanium catalyst components in which titanium trichloride or a titanium trichloride composition is supported on a carrier with a specific surface area of not less than 100 m$^2$/g, and solid titanium catalyst components which contain magnesium, a halogen, an electron donor (preferably an aromatic carboxylate or an alkyl group-containing ether) and titanium as essential components and in which these essential components are supported on a carrier with a specific surface area of not less than 100 m$^2$/g.

Preferred organometallic compound catalyst components are organoaluminum compounds. Examples of the organoaluminum compounds include trialkylaluminums, dialkylaluminum halides, alkylaluminum sesquihalides and alkylaluminum dihalides.

The organoaluminum compounds may be selected appropriately depending on the kind of the titanium catalyst component used.

Examples of the electron donors include organic compounds containing a nitrogen atom, a phosphorus atom, a sulfur atom, a silicon atom, a boron atom or the like. Preferred examples are ester compounds and ether compounds containing these atoms.

The catalysts may be activated by methods such as co-pulverization, or may be prepolymerized with the olefins.

The crystalline isotactic polypropylenes (B) may also be produced using known metallocene catalysts.

Soft Polypropylene Resin Compositions (X)

The soft polypropylene resin compositions (X) of the invention are formed of the propylene copolymer (A) and the crystalline isotactic polypropylene (B).

The soft polypropylene resin composition (X) includes 40 to 98 wt %, preferably 60 to 97 wt %, and more preferably 70 to 95 wt % of the propylene copolymer (A), and 2 to 60 wt %, preferably 3 to 40 wt %, and more preferably 5 to 30 wt % of the crystalline isotactic polypropylene (B) (wherein the total of the component (A) and the component (B) is 100 wt %).

The above ratio of the propylene copolymer (A) and the crystalline isotactic polypropylene (B) leads to a soft polypropylene resin composition (X) excellent in flexibility, rubber elasticity and transparency and further to an adhesive composition (Y) having an optimum solidification time.

The soft polypropylene resin compositions (X) may be obtained by any processes without limitation. For example, polymerizations for the propylene copolymer (A) and the crystalline isotactic polypropylene (B) may be performed simultaneously or successively to produce a composition. Alternatively, the propylene copolymer (A) and the crystalline isotactic polypropylene (B) may be obtained separately and mixed together to give a composition. Still alternatively, the propylene copolymer (A) or the crystalline isotactic polypropylene (B) may be produced first and introduced to a step of producing the other.

The soft polypropylene resin compositions (X) may contain other polymers as optional components while still achieving the object of the invention. In such cases, the amounts of the optional components are not particularly limited, but are preferably about 0.1 to 30 parts by weight based on 100 parts by weight of the soft polypropylene resin composition (X).

Preferred such other polymers include ethylene polymers or copolymers containing ethylene as a main component (51 mol % or more). The incorporation of such polymers in appropriate amounts leads to improved flexibility and low-temperature properties of the obtainable soft polypropylene resin compositions (X).

In an embodiment, the polymer components in the composition may consist solely of the propylene copolymer (A) and the crystalline isotactic polypropylene (B) without other resins. According to such an embodiment, particularly excellent transparency may be achieved.

The soft polypropylene resin compositions (X) of the invention may contain additives as required while still achieving the object of the invention. Such additives include weathering stabilizers, heat stabilizers, antistatic agents, anti-slip agents, antiblocking agents, antifogging agents, nucleating agents, lubricants, pigments, dyes, plasticizers, anti-aging agents, hydrochloric acid absorbers, antioxidants and copper inhibitors.

The soft polypropylene resin compositions (X) may be graft modified with, for example, polar monomers. In detail, such embodiments include soft polypropylene resin compositions (X) in which at least one or both of the propylene copolymer (A) and the crystalline isotactic polypropylene (B) are graft modified with polar monomers.

In particularly preferred embodiments, the soft polypropylene resin compositions (X) satisfy the following requirements (X1) and (X2).

(X1) The composition has a melting peak Tm (A-X) in the range of 30 to 80° C., preferably 30 to 75° C., and more preferably 30 to 65° C. and a melting peak Tm (B-X) in the range of 100 to 175° C., preferably 110 to 170° C., and more preferably 125 to 170° C. in a differential scanning calorimetry (DSC) curve when a sample conditioned at 23° C.±2° C. for at least 72 hours is cooled to not more than −40° C. and heated at a temperature increasing rate of 10° C./min (the first method of DSC measurement and DSC curve preparation method according to the invention). The melting peak Tm (A-X) is assigned to the propylene copolymer (A) and the melting peak Tm (B-X) to the crystalline isotactic polypropylene (B).

When the soft polypropylene resin composition (X) has the above Tm (A-X), the propylene copolymer (A) in the soft polypropylene resin composition (X) forms fine crystal components. Having such fine crystal components facilitates partial incorporation of the propylene copolymer (A) into the crystal of the crystalline isotactic polypropylene (B), with the result that the obtainable adhesive composition (Y) achieves drastically improved mechanical properties, rubber elasticity and heat resistance.

(X2) In the differential scanning calorimetry (DSC) curve, the heat of transition (the melting enthalpy) ΔH (A-X) which gives a melting peak Tm (A-X) is 0.5 to 20 J/g, preferably 0.5 to 15 J/g, and more preferably 0.5 to 12 J/g, and the heat of transition (the melting enthalpy) ΔH (B-X) which gives a melting peak Tm (B-X) is 3 to 80 J/g, preferably 5 to 70 J/g, and more preferably 10 to 60 J/g.

Although the hardness of the soft polypropylene resin compositions (X) is not particularly limited as long as they satisfy the requirements (X1) and (X2), the Shore A hardness is suitably in the range of 40 to 95, preferably 55 to 93, and more preferably 65 to 90.

The Shore A hardness may be determined using a sample prepared and by a method as described in the measurement of the hardness of the propylene copolymer (A) in the requirement (A1).

In a particularly preferred embodiment, the soft polypropylene resin compositions (X) satisfy the following requirement (X3) in addition to the requirements (X1) and (X2).

(X3) A 2 mm thick pressed sheet of the composition has an internal haze of 0.1 to 30% and a total light transmittance of 75 to 99.9%, and preferably an internal haze of 0.1 to 25% and a total light transmittance of 80 to 99.9%. The internal haze and the total light transmittance may be measured by the following method: The composition is molten by heating at 190 to 230° C. and pressed at a cooling temperature of 15 to 25° C. to give a 2 mm thick sample. The sample is analyzed in a cyclohexanol solution with digital haze meter NDH-2000 manufactured by NIPPON DENSHOKU INDUSTRIES CO., LTD. and light source C to determine the amount of diffused transmitted light and the amount of all transmitted light. The internal haze and the total light transmittance are calculated by the following equations:

Internal haze=100×(amount of diffused transmitted light)/(amount of all transmitted light)

Total light transmittance=100×(amount of all transmitted light)/(amount of incident light)

The soft polypropylene resin compositions (X) of the invention have a characteristic that the propylene copolymer (A) and the crystalline isotactic polypropylene (B) do not have a phase separation structure.

The presence or absence of a phase separation structure may be determined by staining a sample prepared as described in the measurement of internal haze and total light transmittance with ruthenium acid and observing it with a transmission electron microscope (TEM). Without a phase separation structure, the soft polypropylene resin composition (X) usually has an internal haze and a total light transmittance in the above ranges.

The melt flow rate (MFR) (ASTM D 1238, 230° C., 2.16 kg load) of the soft polypropylene resin compositions (X) depends on the MFR of the propylene copolymer (A) and the crystalline isotactic polypropylene (B). The melt flow rate is generally in the range of 0.5 to 500 g/10 min, preferably 1 to 50 g/10 min, and more preferably 2 to 12 g/10 min.

Tackifiers (C)

The tackifier (s) (C) used in the invention may be at least one resin selected from natural rosins, modified rosins, polyterpene resins, synthetic petroleum resins, coumarone resins, phenolic resins, xylene resins, styrene resins, low-molecular weight styrene resins and isoprene resins.

Of these, rosin resins, polyterpene resins and synthetic petroleum resins are preferable, and resins having an aliphatic and/or alicyclic structure are more preferable.

Particularly preferred petroleum resins having an aliphatic and/or alicyclic structure include such rosin resins as partially or completely hydrogenated rosins and derivatives thereof, such polyterpene resins as cyclic terpene homopolymers and copolymers, and such synthetic petroleum resins as aliphatic petroleum resins, alicyclic petroleum resins, aliphatic-alicyclic copolymer resins, and hydrogenated copolymers of naphtha cracked oils and terpenes.

These tackifiers have excellent compatibility with the soft polypropylene resin compositions (X), and the obtainable adhesive compositions (Y) achieve good transparency.

The tackifiers in the invention preferably have a softening point of 25 to 160° C. If the softening point is less than 25° C., the tackifiers may bleed out on the surface. If the softening point exceeds 160° C., the viscosity of the molten composition is increased to cause difficult processability. Suitable examples are ARKON P-70, ARKON P-90, ARKON P-100, ARKON P-115, ARKON P-125 and ARKON P-140 (trade names) manufactured by ARAKAWA CHEMICAL INDUSTRIES, LTD.

The tackifiers (C) may be used singly, or two or more kinds may be used in combination.

Adhesive Compositions (Y) and Adhesive Compositions (Y2)

The adhesive compositions (Y) of the invention include 10 to 70 parts by weight, preferably 15 to 65 parts by weight, and more preferably 25 to 60 parts by weight of the soft polypropylene resin composition (X), and 30 to 90 parts by weight, preferably 35 to 85 parts by weight, and more preferably 40 to 75 parts by weight of the tackifier (C) (wherein the total of the component (X) and the component (C) is 100 parts by weight).

The adhesive compositions (Y) having the above chemical makeup show properties such as flexibility, mechanical properties, heat resistance and bonding properties with good balance.

In applications requiring flexibility, a chemical makeup is preferably adopted in which the soft polypropylene resin composition (X) is in excess over the tackifier (C).

In detail, it is desirable that the amount of the soft polypropylene resin composition (X) is 51 to 70 parts by weight, preferably 55 to 65 parts by weight, and the amount of the tackifier (C) is 30 to 49 parts by weight, preferably 35 to 45 parts by weight.

In the invention, flow modifiers described below may be added as required.

Known flow modifiers which can lower the melt viscosity of the adhesive compositions (Y) may be used, with examples including paraffin process oils, polyolefin waxes, low-molecular weight polyolefins, phthalates, adipates, fatty acid esters, glycols, high-molecular weight epoxy plasticizers and naphthene oils. Of these, polyolefin waxes and low-molecular weight polyolefins are preferable. In particular, low-molecular weight propylene polymers (D) may be suitably used which have a melt viscosity at 190° C. of 1 to 15000 mPa·s, preferably 10 to 12000 mPa·s, and more preferably 25 to 10000 mPa·s.

The low-molecular weight propylene polymers (D) are polymers containing propylene-derived structural units at 40 to 100 mol %, preferably 60 to 100 mol %, and particularly preferably 75 to 100 mol %, with examples including polypropylene waxes (HIWAX manufactured by Mitsui Chemicals, Inc.) and amorphous polypropylenes. The polymers have excellent compatibility with the soft polypropylene resin composition (X) in the adhesive composition (Y2), and thus can improve flowability without deteriorating mechanical properties, heat resistance and transparency. The stereoregularity of the low-molecular weight propylene polymers (D) is not particularly limited, but atactic polypropylene polymers or isotactic polypropylene polymers are preferable because they have higher compatibility with the soft polypropylene resin compositions (X).

The amorphous polypropylenes are not particularly limited. From the viewpoint of heat resistance, suitable polymers are those having a melting peak Tm of 75 to 160° C., more preferably 100 to 155° C., and a heat of transition (a melting enthalpy) $\Delta H$ which gives the melting peak Tm of 5 to 60 J/g, more preferably 15 to 45 J/g. For the determination, a sample is held in DSC at 200° C. for 10 minutes, cooled to $-20°$ C. at a temperature decreasing rate of 20° C./min, held at $-20°$ C. for 1 minute, and heated to 200° C. at a temperature increasing rate of 20° C./min, thereby recording a DSC curve.

In another aspect of the invention, the adhesive compositions (Y2) involve the low-molecular weight propylene polymers (D). They are obtainable by blending 100 parts by weight of the adhesive composition (Y) with 5 to 1000 parts by weight, preferably 5 to 150 parts by weight, and more preferably 10 to 120 parts by weight of the low-molecular weight propylene polymer (D).

The above flow modifiers may be used singly, or two or more kinds may be used in combination.

In the invention, various additives such as inorganic fillers, antioxidants and weathering stabilizers may be added to the adhesive compositions (Y) and the adhesive compositions (Y2) while still achieving the object of the invention.

The adhesive compositions (Y) of the invention may be obtained by melt blending the soft polypropylene resin composition (X), the tackifier (C) and optionally additives such as inorganic fillers, antioxidants and weathering stabilizers.

The adhesive compositions (Y2) of the invention may be obtained by melt blending the soft polypropylene resin composition (X), the tackifier (C), the low-molecular weight propylene polymer (D) and optionally additives such as inorganic fillers, antioxidants and weathering stabilizers.

The melt blending methods are not particularly limited and known mixing methods may be used such as extruders, open roll mills, Banbury mixers, kneaders and melt-mixing tanks. The melt blending temperature is usually 100 to 250° C., and preferably 160 to 230° C.

The adhesive compositions (Y) and the adhesive compositions (Y2) have an appropriate solidification time to ensure a long open time. Accordingly, the adhesive compositions (Y) and the adhesive compositions (Y2) are suitably used as hot melt adhesives or pressure-sensitive adhesives, particularly as hot melt adhesives.

The adhesive compositions (Y) and the adhesive compositions (Y2) of the invention may be used as adhesives for bonding various adherends such as plastics, glass, metals, fibers, synthetic or natural leather, paper and wood materials. In particular, the adhesive compositions are suitable for the bonding in which at least one of the adherends is a plastic material, in particular a polyolefin material, and particularly preferably a polypropylene material.

EXAMPLES

The present invention will be described in detail by presenting examples hereinbelow without limiting the scope of the invention.

First, there will be described components that formed the adhesive compositions used in Examples (components corresponding to the propylene copolymers (A) of the invention, components corresponding to the crystalline isotactic polypropylenes (B) of the invention, and components corresponding to the soft polypropylene resin compositions (X) of the invention), and components that formed the adhesive compositions used in Comparative Examples.

(1) Constituent Components for Compositions (1-1) Propylene/Ethylene/1-Butene Copolymers Corresponding to Propylene Copolymers (A)

Diphenylmethylene(3-tert-butyl-5-ethylcyclopentadienyl) (2,7-di-tert-butylfluorenyl) zirconium dichloride as a polymerization catalyst which was prepared by a method described in JP-A-2007-186664, methylaluminoxane (manufactured by Toso Finechem Corporation, 0.3 mmol in terms of aluminum) as a cocatalyst, and ethylene, propylene and 1-butene as raw materials were polymerized in a hexane solution using a continuous polymerization apparatus to give two kinds of propylene/ethylene/1-butene copolymers (PEBR-1) and (PEBR-2). Properties of PEBR-1 and PEBR-2 are shown in Table 1. DSC curves (recorded by the first method of DSC measurement) thereof are shown in FIGS. 1 and 2, respectively.

(1-2) Propylene/Ethylene Copolymer (Per) Used in Comparative Examples

VISTAMAXX (product name VM6100) manufactured by Exxon Mobil Corporation was used. Properties of PER are shown in Table 1. A DSC curve (recorded by the first method of DSC measurement) thereof is shown in FIG. 3.

(1-3) Propylene/1-Butene Copolymer (PBR) Used in Comparative Examples

A propylene/1-butene copolymer (PBR) was obtained using a metallocene catalyst described in WO 2004/087775. Properties of PBR are shown in Table 1.

The properties of the above components were measured by the following methods.

[Shore A Hardness]

The polymer was preheated for 5 minutes and was pressed for 2 minutes with a hydraulic hot press machine set at 190° C. Immediately thereafter, the polymer was cooled in a cooling tank set at 20° C. for 4 minutes to give a 3 mm thick pressed sheet. The sheet was stored under an environment at 23° C.±2° C. for 72 hours and was tested using an A-type measuring device. The hardness was determined by reading the scale immediately after the indenter touched the sheet (in accordance with ASTM D-2240).

In the production of the pressed sheet, a 100 μm PET film (LUMIRROR manufactured by TORAY INDUSTRIES INC.) was used as a release film.

[Comonomer Contents]

The comonomer contents were determined by analyzing a $^{13}$C-NMR spectrum.

[Molecular Weight Distribution (Mw/Mn)]

The molecular weights were measured by GPC (gel permeation chromatography) using orthodichlorobenzene solvent (a mobile phase) at a column temperature of 140° C. (relative to polystyrene standards, Mw: weight average molecular weight, Mn: number average molecular weight). In detail, the molecular weight distribution (Mw/Mn) was determined as follows using gel permeation chromatograph Alliance GPC-2000 manufactured by Waters Corporation. Two TSK gel GNH6-HT columns and two TSK gel GNH6-HTL columns, each having a diameter of 7.5 mm and a length of 300 mm, were used as the separation columns. The column temperature was set at 140° C. The mobile phase was o-dichlorobenzene (Wako Pure Chemical Industries, Ltd.) containing 0.025 wt % of BHT (Takeda Pharmaceutical Company Limited) as an antioxidant, and was flowed at 1.0 ml/min. The sample concentration was 15 mg/10 ml, and the sample injection volume was 500 μl. A differential refractometer was used as a detector. Standard polystyrenes manufactured by Toso Corporation, Ltd. were used for the molecular weights Mw<1000 and Mw>4×10$^6$, and those manufactured by Pressure Chemical Company were used for the molecular weights 1000≤Mw≤4×10$^6$.

[Stereoregularity (mm)]

The stereoregularity was determined by analyzing a $^{13}$C-NMR spectrum.

[Value B]

The value was determined by analyzing a $^{13}$C-NMR spectrum according to a method described in JP-A-2007-186664.

[Regioregularity (Inversion)]

The regioregularity was determined by analyzing a $^{13}$C-NMR spectrum.

[Glass Transition Temperature (Tg)]

The glass transition temperature was determined by analyzing an endothermic curve obtained by the first method of DSC measurement and DSC curve preparation method according to the invention using an apparatus manufactured by Perkin-Elmer, Inc.

[Melt Flow Rate (MFR)]

The melt flow rate was determined at 230° C. under 2.16 kg load in accordance with ASTM D 1238.

[Melting Point and Melting Enthalpy]

The melting point and the melting enthalpy were analyzed by the first method of DSC measurement and DSC curve preparation method according to the invention described below. An apparatus manufactured by Perkin-Elmer, Inc. was used. The sample used herein was a 3 mm thick pressed sheet prepared under the same conditions as described in the measurement of Shore A hardness and was conditioned at 23° C.±2° C. for 2 weeks before the testing.

(First Method of DSC Measurement and DSC Curve Preparation Method According to Invention)

A sample conditioned at 23° C.±2° C. for at least 72 hours was cooled to −40° C. and was heated at a temperature increasing rate of 10° C./min, thereby recording a DSC curve. The melting point and the melting enthalpy obtained herein were defined as Tm $(A)_1$ and ΔH $(A)_1$.

The melting point of the propylene copolymers (A) may not be observed when they are analyzed by the second method of DSC measurement and DSC curve preparation method according to the invention described later which are used for the determination of the melting point of the crystalline isotactic polypropylenes (B). However, such propylene copolymers (A) are also suitably used in the invention.

[Storage Elastic Modulus (E') Measured by Dynamic Solid Viscoelasticity Measurement (DMA)]

The copolymer was analyzed using RSA-II tester manufactured by Rheometrics in a tensile mode at a measurement frequency of 1 Hz and a temperature increasing rate of 3° C./min in the measurement temperature range of −40 to 100° C. (or the measurement limit temperature), thereby recording a curve showing the temperature dependency of E'. The curve was analyzed to determine E' (MPa) at 23° C. and 40° C., and the temperature at which E' became below 1 MPa. The sample used herein was a 500 μm thick pressed sheet prepared under the same conditions as described in the measurement of Shore A hardness and was conditioned at 23° C.±2° C. for 72 hours before the testing.

[Table 1]

TABLE 1

| Properties | | Unit | PEBR-1 | PEBR-2 | PER | PBR |
|---|---|---|---|---|---|---|
| Shore A hardness | 23° C. instantaneous value | — | 38 | 73 | 65 | 95< |
| Comonomer contents | Ethylene ($C_2$) | mol % | 14.0 | 16.5 | 20.5 | — |
| | Propylene ($C_3$) | mol % | 66.5 | 77.5 | 79.5 | 74.0 |
| | 1-Butene ($C_4$) | mol % | 19.5 | 6.0 | — | 26.0 |
| Molecular weight distribution | Mw/Mn | — | 2.09 | 2.11 | 2.05 | 2.14 |
| Stereoregularity | Mm | % | 90.5 | 91.0 | 92.5 | 92.5 |
| Value B | | — | 1.0 | 1.0 | 1.0 | 1.1 |
| Inversion | 2,1-insertions | % | 0.1> | 0.1> | 0.6 | 0.1> |
| Glass transition temperature | Tg | ° C. | −29.5 | −30.5 | −37.0 | −3.5 |
| Melt flow rate | MFR | g/10 min | 6.5 | 7.0 | 3.5 | 7.0 |
| Melting point (first method of DSC measurement) | Tm $(A)_1$ | ° C. | 51.7 | 55.6 | 55.1 | 79.0 |
| Melting enthalpy (first method of DSC measurement) | ΔH $(A)_1$ | J/g | 0.2 | 11.0 | 3.3 | 36.5 |

TABLE 1-continued

| Properties | | Unit | PEBR-1 | PEBR-2 | PER | PBR |
|---|---|---|---|---|---|---|
| Storage elastic modulus (23° C.) | E' (23° C.) | MPa | 3.1 | 13.8 | 8.8 | 210.0 |
| Storage elastic modulus (40° C.) | E' (40° C.) | MPa | 2.0 | 9.5 | 6.5 | 107.0 |
| Temperature at which E' became below 1 MPa | | ° C. | 47.0 | 58.0 | 55.0 | 79.5 |

(2) Component Corresponding to Crystalline Isotactic Polypropylene (B)
(2-1) Isotactic Polypropylene (PP) Corresponding to Crystalline Isotactic Polypropylene (B)

Tm=160.4° C., ΔH=99.6 J/g, MFR (230° C., 2.16 kg load)= 3.0 g/10 min, mmmm=97.9%

The properties of the isotactic polypropylene (PP) were measured by the following methods.
[Melting Point and Melting Enthalpy]

The melting point Tm (B) and the melting enthalpy ΔH (B) were analyzed by the second method of DSC measurement and DSC curve preparation method according to the invention described below. An apparatus manufactured by Perkin-Elmer, Inc. was used.
(Second Method of DSC Measurement and DSC Curve Preparation Method According to Invention)

The polymer was held at 200° C. for 10 minutes in a differential scanning calorimeter, cooled to −20° C. at a temperature decreasing rate of 10° C./min, held at −20° C. for 1 minute, and heated at a temperature increasing rate of 10° C./min, thereby recording a DSC curve.
[Stereoregularity (mmmm)]

The stereoregularity was determined by analyzing a $^{13}$C-NMR spectrum.
[Melt Flow Rate (MFR)]

The melt flow rate was determined by the same method for determining MFR of the propylene copolymers (A) (described previously).
(3) Components Corresponding to or Comparative with Soft Polypropylene Resin Compositions (X)
(3-1) Soft polypropylene resin composition (X-1) formed from propylene/ethylene/1-butene copolymer (PEBR-1) and isotactic polypropylene (PP)

Figure 4:
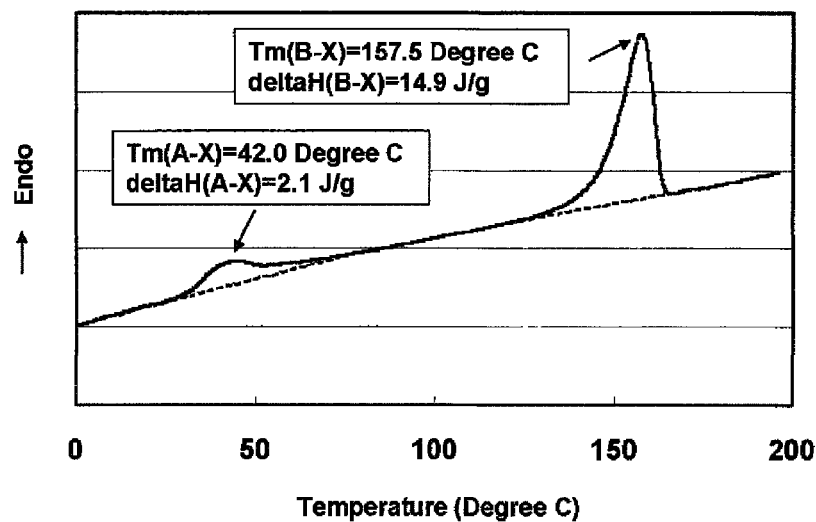
FIG. 4 shows a DSC curve (a first method of DSC measurement) of a soft propylene resin composition (X1) belonging to the soft propylene resin compositions (X) of the invention that was used in Examples 1, 2, 5 and 6.

In Labo Plastomill (manufactured by Toyo Seiki Seisaku-Sho, Ltd.), 85 wt % of the propylene/ethylene/1-butene copolymer (PEBR-1) and 15 wt % of the isotactic polypropylene (PP) were kneaded together (190° C., 3 min, 40 rpm) to give a soft polypropylene resin composition (X1). Properties of the soft polypropylene resin composition (X1) are set forth in Table 2. FIG. 4 shows a DSC curve (the first method of DSC measurement).

The soft polypropylene resin composition (X1) was used in Examples 1, 2, 5 and 6 described later.
(3-2) Soft Polypropylene Resin Composition (X-2) Formed from Propylene/Ethylene/1-Butene Copolymer (PEBR-2) and Isotactic Polypropylene (PP)

Figure 5:
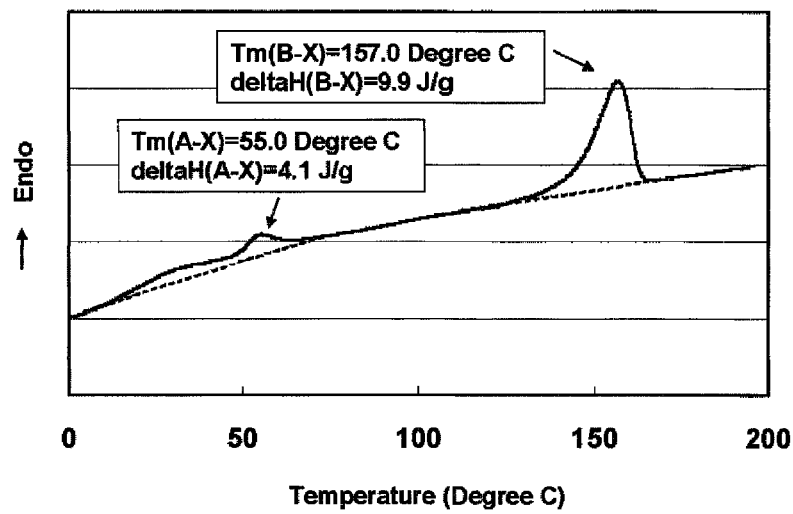
FIG. 5 shows a DSC curve (a first method of DSC measurement) of a soft propylene resin composition (X2) belonging to the soft propylene resin compositions (X) of the invention that was used in Examples 3 and 4.

In Labo Plastomill (manufactured by Toyo Seiki Seisaku-Sho, Ltd.), 90 wt % of the propylene/ethylene/1-butene copolymer (PEBR-2) and 10 wt % of the isotactic polypropylene (PP) were kneaded together (190° C., 3 min, 40 rpm) to give a soft polypropylene resin composition (X2). Properties of the soft polypropylene resin composition (X2) are set forth in Table 2. FIG. 5 shows a DSC curve (the first method of DSC measurement).

The soft polypropylene resin composition (X2) was used in Examples 3 and 4 described later.

(3-3) Soft Polypropylene Resin Composition (X-3) Formed from Propylene/Ethylene Copolymer (PER) and Isotactic Polypropylene (PP)

Figure 6:
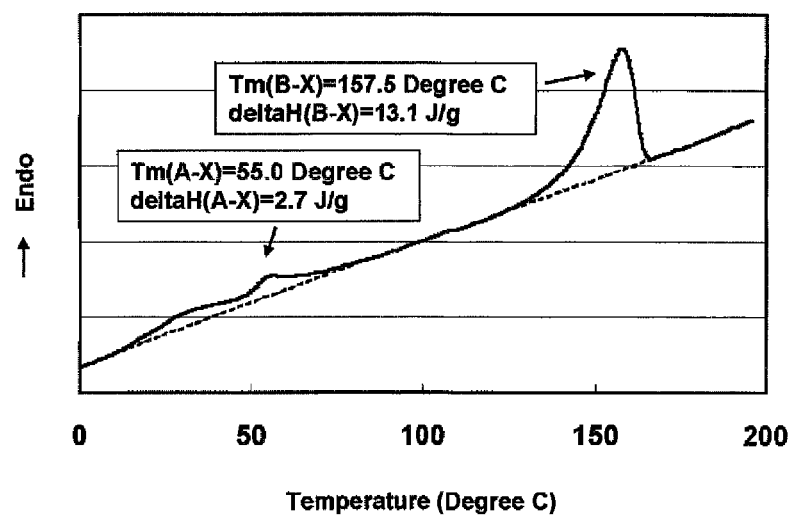
FIG. 6 shows a DSC curve (a first method of DSC measurement) of a soft propylene resin composition (X3) belonging to soft propylene resin compositions (X) that was used in Comparative Examples 3 and 5.

In Labo Plastomill (manufactured by Toyo Seiki Seisaku-Sho, Ltd.), 85 wt % of the propylene/ethylene copolymer (PER) and 15 wt % of the isotactic polypropylene (PP) were kneaded together (190° C., 3 min, 40 rpm) to give a soft polypropylene resin composition (X3). Properties of the soft polypropylene resin composition (X3) are set forth in Table 2. FIG. 6 shows a DSC curve (the first method of DSC measurement).

Figure 7:
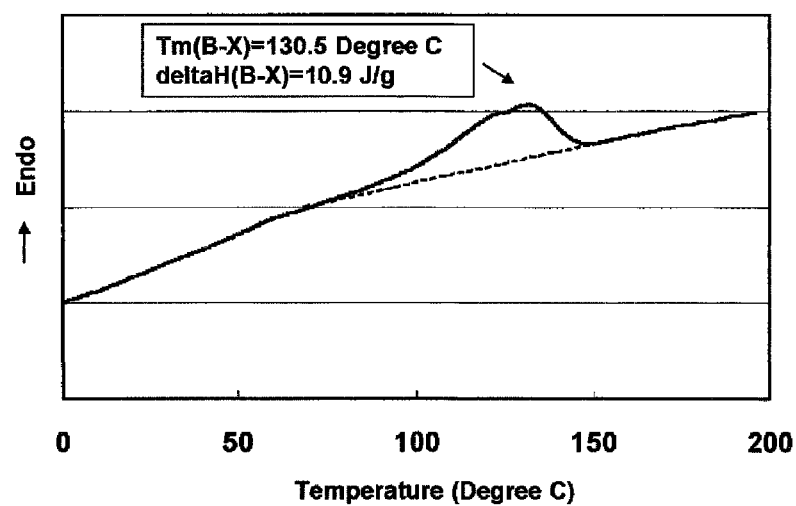
FIG. 7 shows a DSC curve (a first method of DSC measurement) of a soft propylene resin composition (X4) belonging to soft propylene resin compositions (X) that was used in Comparative Example 4.

The soft polypropylene resin composition (X3) was used in Comparative Examples 3 and 5 described later.
(3-4) Commercially Available Soft Polypropylene Material Tafseren (registered trademark) (product name: T-1712) manufactured by Sumitomo Chemical Co., Ltd. was used as a soft polypropylene resin composition (X4). Properties of the soft polypropylene resin composition (X4) are set forth in Table 2. FIG. 7 shows a DSC curve (the first method of DSC measurement).

The soft polypropylene resin composition (X4) had a melting point near 130° C. This showed that the composition contained a crystalline polypropylene component corresponding to the isotactic polypropylene (PP) in the soft polypropylene resin compositions (X1) to (X3).

Figure 8:
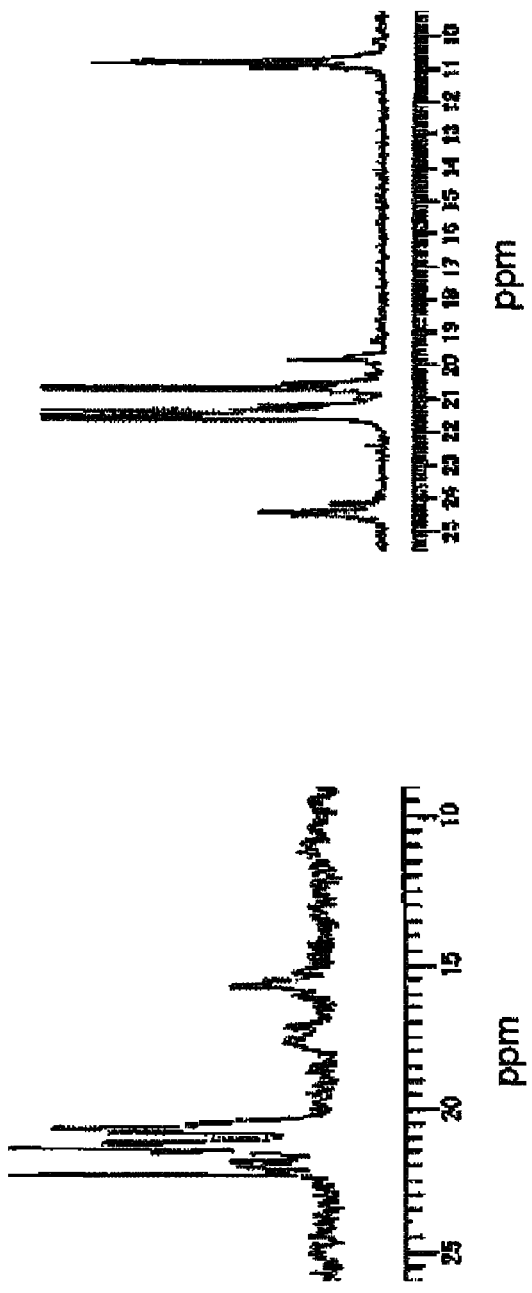
FIG. 8 is a view comparing NMR charts of the propylene copolymer (PEBR-1) of the invention and the soft propylene resin composition (X4) near 15 to 17.5 ppm.

The regioregularity (inversion) of the soft polypropylene resin composition (X4) was evaluated by the same method as that used for the components corresponding to the propylene copolymers (A). FIG. 8 shows a comparison of the NMR result obtained herein (near 15.0 to 17.5 ppm) with the spectrum of the propylene/ethylene/1-butene copolymer (PEBR-1).

As shown in FIG. 8, the soft polypropylene resin composition (X4) had a large peak near 15.0 to 17.5 ppm which would indicate low regioregularity of the soft polypropylene resin composition (X4).

Properties of the compositions were measured by the following methods.
[Melting Point and Melting Enthalpy]

The melting points Tm (A-X) and Tm (B-X) and the melting enthalpies ΔH (A-X) and ΔH (B-X) were analyzed by the first method of DSC measurement and DSC curve preparation method according to the invention described above. An apparatus manufactured by Perkin-Elmer, Inc. was used. The samples used herein were 3 mm thick pressed sheets prepared under the same conditions as described in the measurement of Shore A hardness and were conditioned at 23° C.±2° C. for 2 weeks before the testing.
[Haze and Light Transmittance]

A 2 mm thick pressed sheet prepared under the same conditions as described in the measurement of Shore A hardness was analyzed in a cyclohexanol solution with digital haze meter NDH-2000 manufactured by NIPPON DENSHOKU INDUSTRIES CO., LTD. and light source C to determine the amount of diffused transmitted light and the amount of all transmitted light. The internal haze and the total light transmittance were calculated by the following equations:

Internal haze=100×(amount of diffused transmitted light)/(amount of all transmitted light)

Total light transmittance=100×(amount of all transmitted light)/(amount of incident light)

[Shore A Hardness]

The Shore A hardness was measured by the same method as that used for the propylene copolymers (A) (described previously).

[Melt Flow Rate (MFR)]

The melt flow rate was determined by the same method for determining MFR of the propylene copolymers (A) (described previously).

In the production of the pressed sheet, a silicon-treated, 50 μm PET release film (Cerapeel manufactured by TORAY ADVANCED FILM CO., LTD.) was used as a release film.

Six such sheets were stacked on one another and compressed 25%. The sheets were then allowed to stand at a predetermined temperature (23° C. or 70° C.) for 24 hours and the compression was released. The thickness after the testing was measured. Based on the result, the residual strain (compression set) after the compression for 24 hours was calculated according to the following equation.

Residual strain(%)=100×(thickness before testing−thickness after testing)/(thickness before testing−thickness under compression)

The lower the residual strain, the higher the rubber elasticity.

TABLE 2

| Compositions (X) and constituent components | | | Soft polypropylene resin composition (X1) PEBR-1: 85 wt % PP: 15 wt % | Soft polypropylene resin composition (X2) PEBR-2: 90 wt % PP: 10 wt % | Soft polypropylene resin composition (X3) PER: 85 wt % PP: 15 wt % | Soft polypropylene resin composition (X4) T-1712 |
|---|---|---|---|---|---|---|
| Melting point (First method of DSC measurement) | Tm (A − X) | ° C. | 42.0 | 55.0 | 55.0 | Not observed |
| | Tm (B − X) | ° C. | 157.5 | 157.0 | 157.5 | 130.5 |
| Melting enthalpy (First method of DSC measurement) | ΔH (A − X) | J/g | 2.2 | 4.1 | 2.7 | Not observed |
| | ΔH (B − X) | J/g | 14.9 | 9.9 | 13.1 | 10.9 |
| Internal haze | 2 mm thickness | % | 6.0 | 4.5 | 49.5 | 9.8 |
| Total light transmittance | 2 mm thickness | % | 97.5 | 98.0 | 71.5 | 88.0 |
| Shore A hardness | 23° C. Instantaneous value | — | 71 | 82 | 75 | 62 |
| Melt flow rate | MFR | g/10 min | 6.3 | 6.5 | 3.5 | 0.6 |

Evaluation items and evaluation methods for adhesive compositions prepared in Examples and Comparative Examples will be described below.

[Flexibility (Shore A Hardness, Shore D Hardness)]

The adhesive composition prepared as described in Examples or Comparative Examples was preheated for 5 minutes and was pressed for 2 minutes with a hydraulic hot press machine set at 190° C. Immediately thereafter, the composition was cooled in a cooling tank set at 20° C. for 4 minutes to give a 3 mm thick pressed sheet.

The sheet was stored under an environment at 23° C.±2° C. for 72 hours and was tested using an A-type measuring device. The hardness was determined by reading the scale immediately after the indenter touched the sheet (in accordance with ASTM D-2240). The sheets with a Shore A hardness exceeding 90 were tested with a D-type measuring device, and the hardness was determined by reading the scale 5 seconds after the indenter touched the sheet (in accordance with ASTM D-2240).

In the production of the pressed sheet, a silicon-treated, 50 μm PET release film (Cerapeel manufactured by TORAY ADVANCED FILM CO., LTD.) was used as a release film.

[Rubber Elasticity (Compression Set (CS))]

The adhesive composition prepared as described in Examples or Comparative Examples was preheated for 5 minutes and was pressed for 2 minutes with a hydraulic hot press machine set at 190° C. Immediately thereafter, the composition was cooled in a cooling tank set at 20° C. for 4 minutes to give a 2 mm thick pressed sheet.

[Mechanical Properties (Normal Temperature)]

The adhesive composition prepared as described in Examples or Comparative Examples was preheated for 5 minutes and was pressed for 2 minutes with a hydraulic hot press machine set at 190° C. Immediately thereafter, the composition was cooled in a cooling tank set at 20° C. for 4 minutes to give a 2 mm thick pressed sheet.

The sheet was tested in accordance with JIS K7113-2 to determine the tensile break strength (TS), the elongation at break (between chucks, EL) and the Young's modulus (YM) (measurement temperature: 23° C., stress speed: 200 mm/min, maximum strain: 800%). When the sheet was not broken at a strain of 800%, that stress was obtained as TS.

In the production of the pressed sheet, a silicon-treated, 50 μm PET release film (Cerapeel manufactured by TORAY ADVANCED FILM CO., LTD.) was used as a release film.

[Mechanical Properties (High Temperature)]

The adhesive composition prepared as described in Examples or Comparative Examples was preheated for 5 minutes and was pressed for 2 minutes with a hydraulic hot press machine set at 190° C. Immediately thereafter, the composition was cooled in a cooling tank set at 20° C. for 4 minutes to give a 2 mm thick pressed sheet.

The sheet was stretched 300% with a tensile tester placed in a thermostatic chamber at 80° C. in accordance with JIS K7113-2 to determine the maximum stress σ observed during the stretching. In detail, when the sheet showed a yield strength (YS), the stress σ was the stress at the yield point; when the sheet did not show YS, the stress σ was the stress at the 300% elongation.

In the production of the pressed sheet, a silicon-treated, 50 μm PET release film (Cerapeel manufactured by TORAY ADVANCED FILM CO., LTD.) was used as a release film.

[Thermal Creep Resistance (I) (Adhesive Creep Test)]

Figure 9:
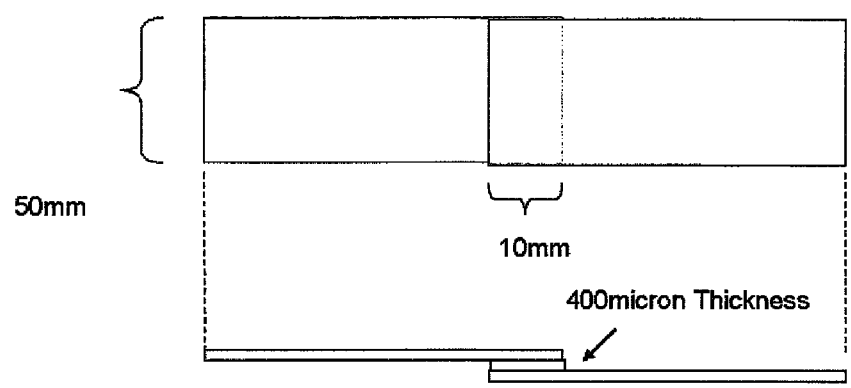
FIG. 9 shows an example of a sample for testing thermal creep resistance of an adhesive composition according to the present invention.

Stainless steel plates (SUS304-BA plates, 50 mm×100 mm, 94 g) were bonded together through the adhesive composition prepared as described in Examples or Comparative Examples with use of a table-top hand press (190° C.), thereby preparing an adhesive test sample (adhesive thickness: 400 μm, adhesive width: 10 mm, see FIG. 9).

The adhesive test sample was placed in an oven set at 80° C. in a manner such that the sample was hung with one end thereof being fixed and a load of 120 g/cm$^2$ was given to the sample. The sample was then stabilized for 30 minutes.

Thereafter, the set temperature in the oven was changed to 180° C. and the temperature in the oven was gradually increased. The temperature which caused the sample to drop was obtained as the dropping temperature. When the sample dropped during the 30 minutes of stabilization at 80° C., the dropping temperature was 80° C.

The fracture morphology of the sample that had been dropped was observed to determine whether the composition had cohesive failure (fracture of the adhesive composition) or interfacial failure (debonding at the interface with the SUS plate). The compositions that had cohesive failure were evaluated to have good adhesion with the SUS plates.

[Transparency (Total Haze, Total Light Transmittance)]

The adhesive composition prepared as described in Examples or Comparative Examples was preheated for 5 minutes and was pressed for 2 minutes with a hydraulic hot press machine set at 190° C. Immediately thereafter, the composition was cooled in a cooling tank set at 20° C. for 4 minutes to give a 2 mm thick pressed sheet.

In the production of the pressed sheet, a silicon-treated, 50 μm PET release film (Cerapeel manufactured by TORAY ADVANCED FILM CO., LTD.) was used as a release film.

The pressed sheet was analyzed in the air with digital haze meter NDH-2000 manufactured by NIPPON DENSHOKU INDUSTRIES CO., LTD. and light source C to determine the amount of diffused transmitted light and the amount of all transmitted light. The total haze and the total light transmittance were calculated by the following equations.

Total haze=100×(amount of diffused transmitted light)/(amount of all transmitted light)

Total light transmittance=100×(amount of all transmitted light)/(amount of incident light)

[Solidification Rate (Crystallization Rate)]

The solidification rate was evaluated based on the crystallization temperature Tc observed in DSC measurement. The crystallization temperature Tc was determined by analysis based on the third method of DSC measurement and DSC curve preparation method according to the invention described below. In detail, the maximum exothermic peak observed during the cooling from 200° C. to −20° C. at a temperature decreasing rate of 20° C./min was obtained as Tc.

When the sample did not show any Tc during the cooling from 200° C. to −20° C. regardless of the size of the peaks, the sample was held at −20° C. for 1 minute and was heated from −20° C. to 200° C. at a temperature increasing rate of 20° C./min and the maximum exothermic peak observed was obtained as Tc. An apparatus manufactured by Perkin-Elmer, Inc. was used.

(Third Method of DSC Measurement and DSC Curve Preparation Method According to Invention)

The composition was held at 200° C. for 10 minutes in a differential scanning calorimeter, cooled to −20° C. at a temperature decreasing rate of 20° C./min, held at −20° C. for 1 minute, and heated to 200° C. at a temperature increasing rate of 20° C./min, thereby recording a DSC curve.

Example 1

In Labo Plastomill (manufactured by Toyo Seiki Seisaku-Sho, Ltd.), 60 parts by weight of the soft polypropylene resin composition (X1) and 40 parts by weight of a tackifier (C) (an alicyclic saturated hydrocarbon resin, trademark: ARKON P-125 manufactured by ARAKAWA CHEMICAL INDUSTRIES, LTD.) were kneaded together (190° C., 5 min, 60 rpm) to give an adhesive composition (Y)-1. The results of evaluations of the adhesive composition (Y)-1 are set forth in Table 3.

Example 2

In Labo Plastomill (manufactured by Toyo Seiki Seisaku-Sho, Ltd.), 40 parts by weight of the soft polypropylene resin composition (X1) and 60 parts by weight of a tackifier (C) (an alicyclic saturated hydrocarbon resin, trademark: ARKON P-125 manufactured by ARAKAWA CHEMICAL INDUSTRIES, LTD.) were kneaded together (190° C., 5 min, 60 rpm) to give an adhesive composition (Y)-2. The results of evaluations of the adhesive composition (Y)-2 are set forth in Table 3.

Example 3

In Labo Plastomill (manufactured by Toyo Seiki Seisaku-Sho, Ltd.), 60 parts by weight of the soft polypropylene resin composition (X2) and 40 parts by weight of a tackifier (C) (an alicyclic saturated hydrocarbon resin, trademark: ARKON P-125 manufactured by ARAKAWA CHEMICAL INDUSTRIES, LTD.) were kneaded together (190° C., 5 min, 60 rpm) to give an adhesive composition (Y)-3. The results of evaluations of the adhesive composition (Y)-3 are set forth in Table 3.

Example 4

In Labo Plastomill (manufactured by Toyo Seiki Seisaku-Sho, Ltd.), 40 parts by weight of the soft polypropylene resin composition (X2) and 60 parts by weight of a tackifier (C) (an alicyclic saturated hydrocarbon resin, trademark: ARKON P-125 manufactured by ARAKAWA CHEMICAL INDUSTRIES, LTD.) were kneaded together (190° C., 5 min, 60 rpm) to give an adhesive composition (Y)-4. The results of evaluations of the adhesive composition (Y)-4 are set forth in Table 3.

Comparative Example 1

In Labo Plastomill (manufactured by Toyo Seiki Seisaku-Sho, Ltd.), 60 parts by weight of the propylene/ethylene copolymer (PER) in place of the soft polypropylene resin composition (X1) used in Example 1, and 40 parts by weight of a tackifier (C) (an alicyclic saturated hydrocarbon resin, trademark: ARKON P-125 manufactured by ARAKAWA CHEMICAL INDUSTRIES, LTD.) were kneaded together (190° C., 5 min, 60 rpm) to give an adhesive composition (Y)-5. The results of evaluations of the adhesive composition (Y)-5 are set forth in Table 3.

Comparative Example 2

In Labo Plastomill (manufactured by Toyo Seiki Seisaku-Sho, Ltd.), 60 parts by weight of the propylene/1-butene copolymer (PBR) in place of the soft polypropylene resin composition (X1) used in Example 1, and 40 parts by weight of a tackifier (C) (an alicyclic saturated hydrocarbon resin, trademark: ARKON P-125 manufactured by ARAKAWA CHEMICAL INDUSTRIES, LTD.) were kneaded together (190° C., 5 min, 60 rpm) to give an adhesive composition (Y)-6. The results of evaluations of the adhesive composition (Y)-6 are set forth in Table 3.

Comparative Example 3

In Labo Plastomill (manufactured by Toyo Seiki Seisaku-Sho, Ltd.), 60 parts by weight of the soft polypropylene resin composition (X3) in place of the soft polypropylene resin composition (X1) used in Example 1, and 40 parts by weight of a tackifier (C) (an alicyclic saturated hydrocarbon resin, trademark: ARKON P-125 manufactured by ARAKAWA CHEMICAL INDUSTRIES, LTD.) were kneaded together (190° C., 5 min, 60 rpm) to give an adhesive composition (Y)-7. The results of evaluations of the adhesive composition (Y)-7 are set forth in Table 3.

Comparative Example 4

In Labo Plastomill (manufactured by Toyo Seiki Seisaku-Sho, Ltd.), 60 parts by weight of the soft polypropylene resin composition (X4) in place of the soft polypropylene resin composition (X1) used in Example 1, and 40 parts by weight of a tackifier (C) (an alicyclic saturated hydrocarbon resin, trademark: ARKON P-125 manufactured by ARAKAWA CHEMICAL INDUSTRIES, LTD.) were kneaded together (190° C., 5 min, 60 rpm) to give an adhesive composition (Y)-8. The results of evaluations of the adhesive composition (Y)-8 are set forth in Table 3.

TABLE 3

| | | | Ex. 1 | Ex. 2 | Ex. 3 | Ex. 4 |
|---|---|---|---|---|---|---|
| Soft polypropylene resin composition (X1): Propylene/ethylene/1-butene copolymer (PEBR-1) = 85 wt % Isotactic polypropylene (PP) = 15 wt % | | | 60 | 40 | | |
| Soft polypropylene resin composition (X2): Propylene/ethylene/1-butene copolymer (PEBR-2) = 90 wt % Isotactic polypropylene (PP) = 10 wt % | | | | | 60 | 40 |
| Propylene/ethylene copolymer (PER) | | | | | | |
| Propylene/1-butene copolymer (PBR) | | | | | | |
| Soft polypropylene resin composition (X3): Propylene/ethylene copolymer (PER) = 85 wt % Isotactic polypropylene (PP) = 15 wt % | | | | | | |
| Soft polypropylene resin composition (X4): Commercially available amorphous soft propylene material | | | | | | |
| Tackifier (C) | | | 40 | 60 | 40 | 60 |
| Flexibility | Shore A (23° C., instantaneous value) | | 71 | 95< | 79 | 95< |
| | Shore D (23° C., value after 5 seconds) | | — | 36 | — | 38 |
| Rubber elasticity | Compression set CS (23° C.) | % | 31 | 62 | 23 | 59 |
| | Compression set CS (70° C.) | % | 75 | 67 | 75 | 77 |
| Mechanical properties (normal temperature) | Tensile break strength TS (23° C.) | MPa | 8< | 12 | 10< | 13 |
| | Elongation at break EL (23° C.) | % | 800< | 750 | 800< | 730 |
| | Young's modulus YM (23° C.) | MPa | 13 | 300 | 26 | 320 |
| Mechanical properties (high temperature) | Maximum stress σ (80° C.) | MPa | 0.23 | 0.10 | 0.16 | 0.07 |
| Thermal creep resistance (I) | Dropping temperature | ° C. | 146 | 138 | 138 | 133 |
| | Fracture morphology | | Cohesive failure | Cohesive failure | Cohesive failure | Cohesive failure |
| Transparency | Total haze | % | 10.0 | 5.5 | 8.0 | 5.0 |
| | Total light transmittance | % | 89.0 | 90.0 | 89.5 | 89.5 |
| Solidification rate | Crystallization temperature Tc | ° C. | 38 (Temperature was increased.) | 42 (Temperature was increased.) | Not measured | Not measured |

| | | | Comp. Ex. 1 | Comp. Ex. 2 | Comp. Ex. 3 | Comp. Ex. 4 |
|---|---|---|---|---|---|---|
| Soft polypropylene resin composition (X1): Propylene/ethylene/1-butene copolymer (PEBR-1) = 85 wt % Isotactic polypropylene (PP) = 15 wt % | | | | | | |
| Soft polypropylene resin composition (X2): Propylene/ethylene/1-butene copolymer (PEBR-2) = 90 wt % Isotactic polypropylene (PP) = 10 wt % | | | | | | |
| Propylene/ethylene copolymer (PER) | | | 60 | | | |
| Propylene/1-butene copolymer (PBR) | | | | 60 | | |
| Soft polypropylene resin composition (X3): Propylene/ethylene copolymer (PER) = 85 wt % Isotactic polypropylene (PP) = 15 wt % | | | | | 60 | |
| Soft polypropylene resin composition (X4): | | | | | | 60 |

TABLE 3-continued

| Commercially available amorphous soft propylene material | | | | | | |
|---|---|---|---|---|---|---|
| Tackifier (C) | | | 40 | 40 | 40 | 40 |
| Flexibility | Shore A (23° C., instantaneous value) | | 48 | 95< | 72 | 85 |
| | Shore D (23° C., value after 5 seconds) | | — | 55 | — | — |
| Rubber elasticity | Compression set CS (23° C.) | % | 48 | 93 | 26 | 59 |
| | Compression set CS (70° C.) | % | 100 | 100 | 71 | 91 |
| Mechanical properties (normal temperature) | Tensile break strength TS (23° C.) | MPa | 2< | 17 | 11 | 8< |
| | Elongation at break EL (23° C.) | % | 800< | 450 | 770 | 800< |
| | Young's modulus YM (23° C.) | MPa | 5 | 780 | 17 | 43 |
| Mechanical properties (high temperature) | Maximum stress σ (80° C.) | MPa | 0.01 | 0.03 | 0.13 | 0.14 |
| Thermal creep resistance (I) | Dropping temperature | ° C. | 80 | 80 | 131 | 124 |
| | Fracture morphology | | Cohesive failure | Cohesive failure | Cohesive failure | Cohesive failure |
| Transparency | Total haze | % | 9.0 | 11.0 | 23.0 | 7.0 |
| | Total light transmittance | % | 88.0 | 84.0 | 87.0 | 88.0 |
| Solidification rate | Crystallization temperature Tc | ° C. | None | None | 51 | 63 |

Example 5

In Labo Plastomill (manufactured by Toyo Seiki Seisaku-Sho, Ltd.), 60 parts by weight of the soft polypropylene resin composition (X1), 40 parts by weight of a tackifier (C) (an alicyclic saturated hydrocarbon resin, trademark: ARKON P-125 manufactured by ARAKAWA CHEMICAL INDUSTRIES, LTD.) and, based on 100 parts by weight of the total of (X1) and (C), 30 parts by weight of a polypropylene wax (trade name: NP055 manufactured by Mitsui Chemicals, Inc., melt viscosity at 190° C.: 52 mPa·s) as a low-molecular weight propylene polymer (D1) were kneaded together (190° C., 5 min, 60 rpm) to give an adhesive composition (Y2)-1. The results of evaluations of the adhesive composition (Y2)-1 are set forth in Table 4. The melt viscosity of the polypropylene wax was measured at 190° C. with a Brookfield viscometer.

Example 6

In Labo Plastomill (manufactured by Toyo Seiki Seisaku-Sho, Ltd.), 60 parts by weight of the soft polypropylene resin composition (X1), 40 parts by weight of a tackifier (C) (an alicyclic saturated hydrocarbon resin, trademark: ARKON P-125 manufactured by ARAKAWA CHEMICAL INDUSTRIES, LTD.) and, based on 100 parts by weight of the total of (X1) and (C), 30 parts by weight of APAO (trade name: RT2180 manufactured by Huntsman Corporation, melt viscosity at 190° C.: 8000 mPa·s) as a low-molecular weight propylene polymer (D2) were kneaded together (190° C., 5 min, 60 rpm) to give an adhesive composition (Y2)-2. The results of evaluations of the adhesive composition (Y2)-2 are set forth in Table 4. The melt viscosity of the APAO was measured at 190° C. with a Brookfield viscometer.

Comparative Example 5

In Labo Plastomill (manufactured by Toyo Seiki Seisaku-Sho, Ltd.), 60 parts by weight of the soft polypropylene resin composition (X3) in place of the soft polypropylene resin composition (X1) used in Example 5, 40 parts by weight of a tackifier (C) (an alicyclic saturated hydrocarbon resin, trademark: ARKON P-125 manufactured by ARAKAWA CHEMICAL INDUSTRIES, LTD.) and, based on 100 parts by weight of the total of (X1) and (C), 30 parts by weight of a polypropylene wax (trade name: NP055 manufactured by Mitsui Chemicals, Inc., melt viscosity at 190° C.: 52 mPa·s) as a low-molecular weight propylene polymer (D1) were kneaded together (190° C., 5 min, 60 rpm) to give an adhesive composition (Y2)-2. The results of evaluations of the adhesive composition (Y2)-3 are set forth in Table 4. The melt viscosity of the polypropylene wax was measured at 190° C. with a Brookfield viscometer.

TABLE 4

| | | | Ex. 5 | Ex. 6 | Comp. Ex. 5 |
|---|---|---|---|---|---|
| Soft polypropylene resin composition (X1): | | | 60 | 60 | |
| Propylene/ethylene/1-butene copolymer (PEBR-1) = 85 wt % | | | | | |
| Isotactic polypropylene (PP) = 15 wt % | | | | | |
| Soft polypropylene resin composition (X3): | | | | | 60 |
| Propylene/ethylene copolymer (PER) = 90 wt % | | | | | |
| Isotactic polypropylene (PP) = 10 wt % | | | | | |
| Tackifier (C) | | | 40 | 40 | 40 |
| Low-molecular weight propylene polymer (D1): | | | 30 | | 30 |
| Polypropylene wax | | | | | |
| Low-molecular weight propylene polymer (D2): | | | | 30 | |
| APAO | | | | | |
| Flexibility | Shore A (23° C., instantaneous value) | | 92 | 72 | 93 |
| | Shore D (23° C., value after 5 seconds) | | 25 | — | 29 |
| Rubber elasticity | Compression set CS (23° C.) | % | 44 | 28 | 45 |
| | Compression set CS (70° C.) | % | 85 | 70 | 87 |

TABLE 4-continued

|  |  |  | Ex. 5 | Ex. 6 | Comp. Ex. 5 |
|---|---|---|---|---|---|
| Mechanical properties (normal temperature) | Tensile break strength TS (23° C.) | MPa | 14< | 7< | 12< |
|  | Elongation at break EL (23° C.) | % | 800< | 800< | 800< |
|  | Young's modulus YM (23° C.) | MPa | 85 | 13 | 110 |
| Mechanical properties (high temperature) | Maximum stress σ (80° C.) | MPa | 0.84 | 0.34 | 0.75 |
| Thermal creep resistance (I) | Dropping temperature | ° C. | 152 | 150 | 150 |
|  | Fracture morphology |  | Cohesive failure | Cohesive failure | Cohesive failure |
| Transparency | Total haze | % | 23.0 | 9.0 | 39.0 |
|  | Total light transmittance | % | 88.0 | 90.0 | 87.0 |

The above results lead to the following conclusions.

As demonstrated in Examples 1 and 3, the adhesive compositions (Y) according to the invention have excellent flexibility and rubber elasticity and show good followability to stress and deformation. The adhesive compositions (Y) are flexible but are still excellent in strength and bonding performance at high temperatures and have high heat resistance.

Further, as shown in Examples 1 to 4, 5 and 6, the adhesive compositions (Y) of the invention have excellent transparency. Furthermore, the adhesive compositions from Examples 1 and 2 have an appropriate solidification time, and a long open time of hot melt adhesives is achieved.

Next, Reference Examples will be presented in which a low-molecular weight polypropylene (D) was added to the soft polypropylene resin composition (X) and the flowability and heat resistance of the resultant composition were evaluated.

Flowability and heat resistance may be enhanced by adding a low-molecular weight polypropylene (D) to the soft polypropylene resin composition (X). Reference Comparative Examples and Reference Examples will be presented below to describe compositions (Z) formed from the soft polypropylene resin composition (X) and a low-molecular weight polypropylene (D). The melting point Tm and the melting enthalpy ΔHm were measured by the third method of DSC measurement and DSC curve preparation method according to the invention. The melt flow rate and the thermal creep resistance of the compositions (Z) were measured by the following methods, and the flexibility and the mechanical properties were evaluated by the same methods as for the adhesive compositions prepared in Examples and Comparative Examples.

[Melt Flow Rate (MFR)]

The melt flow rate was measured at 230° C. under 2.16 kg load in accordance with ASTM D 1238.

[Thermal Creep Resistance (II) (Thermal Creep Amount (%))]

The adhesive composition in Reference Comparative Examples or Reference Examples was preheated for 3 minutes and was pressed for 3 minutes with a hydraulic hot press machine set at 190° C. Immediately thereafter, the composition was cooled in a cooling tank set at 20° C. for 3 minutes to give a 2 mm thick pressed sheet. A test piece 5 mm in width and 40 mm in length was prepared from the sheet, and was tested with a viscoelastometer (RSA-III manufactured by TA Instruments). In detail, the upper and lower ends of the test piece leaving 20 mm were lightly fixed with chucks at room temperature. The test piece was cooled to −40° C. and was tightly fixed. The temperature was increased to 100° C. When the temperature stabilized, a tensile force of 0.1 MPa was applied and the creep amount (%) after 30 minutes was measured.

In the production of the pressed sheet, a 100 μm PET film (LUMIRROR manufactured by TORAY INDUSTRIES INC.) was used as a release film.

Reference Comparative Example 1

The soft polypropylene resin composition (X1) was evaluated. The evaluation results are set forth in Table 5.

Reference Example 1

In Labo Plastomill (manufactured by Toyo Seiki Seisaku-Sho, Ltd.), 80 parts by weight of the soft polypropylene resin composition (X1) and 20 parts by weight of APAO (trade name: RT2180 manufactured by Huntsman Corporation, melt viscosity at 190° C.: 8000 mPa·s, melting point Tm: 152° C., melting enthalpy ΔHm: 32.5 J/g) as a low-molecular weight propylene polymer (D2) were kneaded together (200° C., 10 min, 40 rpm) to give a composition (Z)-1. The results of evaluations of the composition (Z)-1 are set forth in Table 5.

Reference Example 2

In Labo Plastomill (manufactured by Toyo Seiki Seisaku-Sho, Ltd.), 60 parts by weight of the soft polypropylene resin composition (X1) and 40 parts by weight of APAO (trade name: RT2180 manufactured by Huntsman Corporation, melt viscosity at 190° C.: 8000 mPa·s, melting point Tm: 152° C., melting enthalpy ΔHm: 32.5 J/g) as a low-molecular weight propylene polymer (D2) were kneaded together (200° C., 10 min, 40 rpm) to give a composition (Z)-2. The results of evaluations of the composition (Z)-2 are set forth in Table 5.

Reference Comparative Example 2

The soft polypropylene resin composition (X2) was evaluated. The evaluation results are set forth in Table 5.

Reference Example 3

In Labo Plastomill (manufactured by Toyo Seiki Seisaku-Sho, Ltd.), 80 parts by weight of the soft polypropylene resin composition (X2) and 20 parts by weight of APAO (trade name: RT2180 manufactured by Huntsman Corporation, melt viscosity at 190° C.: 8000 mPa·s, melting point Tm: 152° C., melting enthalpy ΔHm: 32.5 J/g) as a low-molecular weight propylene polymer (D2) were kneaded together (200° C., 10 min, 40 rpm) to give a composition (Z)-3. The results of evaluations of the composition (Z)-3 are set forth in Table 5.

Reference Example 4

In Labo Plastomill (manufactured by Toyo Seiki Seisaku-Sho, Ltd.), 60 parts by weight of the soft polypropylene resin composition (X2) and 40 parts by weight of APAO (trade name: RT2180 manufactured by Huntsman Corporation, melt viscosity at 190° C.: 8000 mPa·s, melting point Tm: 152° C., melting enthalpy ΔHm: 32.5 J/g) as a low-molecular weight propylene polymer (D2) were kneaded together (200° C., 10 min, 40 rpm) to give a composition (Z)-4. The results of evaluations of the composition (Z)-4 are set forth in Table 5.

TABLE 5

|  |  |  | Ref. Comp. Ex. 1 | Ref. Ex. 1 | Ref. Ex. 2 | Ref. Comp. Ex. 2 | Ref. Ex. 3 | Ref. Ex. 4 |
|---|---|---|---|---|---|---|---|---|
| Soft polypropylene resin composition (X1): Propylene/ethylene/1-butene copolymer (PEBR-1) = 85 wt % Isotactic polypropylene (PP) = 15 wt % |  |  | 100 | 80 | 60 |  |  |  |
| Soft polypropylene resin composition (X2): Propylene/ethylene/1-butene copolymer (PEBR-2) = 90 wt % Isotactic polypropylene (PP) = 10 wt % |  |  |  |  |  | 100 | 80 | 60 |
| Low-molecular weight propylene polymer (D2): APAO |  |  |  | 20 | 40 |  | 20 | 40 |
| Melt flow rate | (230° C., 2.16 kg load) | g/10 min | 6 | 11 | 30 | 6 | 12 | 35 |
| Flexibility | Shore A (23° C., instantaneous value) |  | 70 | 75 | 80 | 82 | 84 | 85 |
| Mechanical properties | Tensile break strength TS (23° C.) | MPa | 12< | 12< | 11 | 19< | 16 | 13< |
|  | Elongation at break EL (23° C.) | % | 800< | 800< | 770 | 800< | 750 | 800< |
|  | Young's modulus YM (23° C.) | MPa | 12 | 16 | 21 | 25 | 29 | 32 |
| Heat resistance | Thermal creep resistance (II) (creep amount) | % | 43 | 32 | 33 | 184 | 67 | 39 |

The results in Reference Comparative Examples and Reference Examples indicate the following.

As shown in Reference Comparative Example 1 and Reference Examples 1 and 2, the compositions (Z)-1 and (Z)-2 have an increased melt flow rate and a smaller thermal creep amount compared with the soft polypropylene resin composition (X1). These results show that the flowability and the heat resistance were improved. Similarly, Reference Comparative Example 2 and Reference Examples 3 and 4 demonstrate that the compositions (Z)-3 and (Z)-4 have higher flowability and heat resistance compared with the soft polypropylene resin composition (X2).

The invention claimed is:

1. A hot melt adhesive consisting of:
   10 to 70 parts of a polypropylene resin composition (X);
   30 to 90 parts of at least one tackifier (C) selected from the group consisting of natural rosins, modified rosins, polyterpene resins, synthetic petroleum resins, coumarone resins, phenolic resins, xylene resins, styrene resins, and isoprene resins, wherein the total of the component (X) and the component (C) is 100 parts by weight; and
   optionally at least one first additive selected from the group consisting of a flow modifier, an inorganic filler, an antioxidant and a weathering stabilizer, wherein the polypropylene resin composition (X) consists of:
   40 to 98 wt. % of a propylene copolymer (A) satisfying the following requirements (A1) to (A8):
   (A1) the Shore A hardness is in the range of 20 to 90;
   (A2) the propylene copolymer is a propylene/ethylene/$C_{4-20}$ α-olefin copolymer comprising: 51 to 90 mol. % of structural units derived from propylene, 7 to 24 mol. % of structural units derived from ethylene and 3 to 25 mol. % of structural units derived from an α-olefin having 4 to 20 carbon atoms, wherein the total of the structural units from propylene, the structural units from ethylene and the structural units from an α-olefin having 4 to 20 carbon atoms is 100 mol. %;
   (A3) the ratio, of the weight average molecular weight, Mw, to the number average molecular weight, Mn, according to gel permeation chromatography, GPC, is 1.2 to 3.5;
   (A4) the isotactic triad fraction, ram, calculated by $^{13}$C-NMR is 85 to 99.9%:
   (A5) the value B defined by Formula below is 0.8 to 1.3:

$$B = \frac{M_{OE}}{2M_O \cdot M_E} \quad (1)$$

wherein $M_{oe}$ is a molar fraction of the total of propylene-ethylene sequences and $C_4$ or higher α-olefin-ethylene sequences to all the dyad sequences, $M_o$ is a total of molar fractions of propylene and the $C_4$ or higher α-olefin, and $M_E$, is a molar fraction of ethylene;
   (A6) the ratio of 2,1-insertions of propylene monomers in all propylene insertions is less than 1% according to $^{13}$C-NMR;
   (A7) the glass transition temperature, Tg, is observed in the range of −10° C. to −50° C.;
   (A8) MFR, as measured in accordance with ASTM D 1238 at 230° C. under a load of 2.16 kg, is 0.5 to 500 g/10 min;
   2 to 60 wt. % of a crystalline isotactic polypropylene (B) satisfying the following requirements (B1) to (B3):
   (B1) the melting point, Tm, is in the range of 100 to 175° C. as measured by DSC wherein the polymer is held at 200° C. for 10 minutes in a differential scanning calorimeter, DSC, cooled to −20° C. at a temperature decreasing rate of 10° C./min, held at −20° C. for 1 minute, and heated at a temperature increasing rate of 10° C./min;
   (B2) the isotactic pentad fraction, mmmm, is 90 to 99.8%; and
   (B3) the melt flow rate, MFR, as measured in accordance with ASTM D 1238 at 230° C. under a load of 2.16 kg, is 0.1 to 100 g/10 min; and
   optionally at least one second additive selected from the group consisting of weathering stabilizer, heat stabilizer, antistatic agent, anti-slip agent, antiblocking agent, antifogging agent, nucleating agent, lubricant, pigment, dye, plasticizer, anti-aging agent, hydrochloric acid absorber, antioxidant and copper inhibitor.

2. The hot melt adhesive of claim 1, wherein the at least one tackifier (C) is selected from the group consisting of natural rosins.

3. The hot melt adhesive of claim 1, wherein the at least one tackifier (C) is selected from the group consisting of modified rosins.

4. The hot melt adhesive of claim 1, wherein the at least one tackifier (C) is selected from the group consisting of polyterpene resins.

5. The hot melt adhesive of claim 1, wherein the at least one tackifier (C) is selected from the group consisting of synthetic petroleum resins.

6. The hot melt adhesive of claim 1, wherein the at least one tackifier (C) is selected from the group consisting of coumarone resins.

7. The hot melt adhesive of claim 1, wherein the at least one tackifier (C) is selected from the group consisting of phenolic resins.

8. The hot melt adhesive of claim 1, wherein the at least one tackifier (C) is selected from the group consisting of xylene resins.

9. The hot melt adhesive of claim 1, wherein the at least one tackifier (C) is selected from the group consisting of styrene resins.

10. The hot melt adhesive of claim 1, wherein the at least one tackifier (C) is selected from the group consisting of isoprene resins.

\* \* \* \* \*